(12) United States Patent
Koshio et al.

(10) Patent No.: US 8,057,619 B2
(45) Date of Patent: Nov. 15, 2011

(54) MANUFACTURING SYSTEM FOR AN OPTICAL DISPLAY DEVICE, MANUFACTURING METHOD FOR AN OPTICAL DISPLAY DEVICE, EXCLUDING DEVICE AND EXCLUDING METHOD

(75) Inventors: Satoru Koshio, Ibaraki (JP); Kazuo Kitada, Ibaraki (JP); Tomokazu Yura, Ibaraka (JP); Takuya Nakazono, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 12/865,284

(22) PCT Filed: Apr. 7, 2009

(86) PCT No.: PCT/JP2009/057140
§ 371 (c)(1),
(2), (4) Date: Jul. 29, 2010

(87) PCT Pub. No.: WO2009/125771
PCT Pub. Date: Oct. 15, 2009

(65) Prior Publication Data
US 2010/0326589 A1 Dec. 30, 2010

(30) Foreign Application Priority Data

Apr. 8, 2008 (JP) .................................. 2008-100622
Apr. 7, 2009 (JP) .................................. 2009-092652

(51) Int. Cl.
B29C 65/00 (2006.01)
B32B 37/00 (2006.01)
B32B 38/00 (2006.01)

(52) U.S. Cl. .......... 156/191; 156/64; 156/250; 156/256; 156/268; 156/289; 156/324; 156/378; 156/519; 156/538

(58) Field of Classification Search .................... 156/64, 156/250, 256, 257, 268–270, 289, 324, 350–354, 156/378–379, 510, 516–517, 519–521, 538, 252, 253, 360, 361
See application file for complete search history.

(56) References Cited

U.S. PATENT DOCUMENTS 7,922,843 B2 * 4/2011 Kitada et al. .................... 156/64
(Continued)

FOREIGN PATENT DOCUMENTS

EP 2237249 A1 10/2010
(Continued)

OTHER PUBLICATIONS

Notification of Transmittal of Translation of the International Preliminary Report on Patentability (Form PCT/IB/338 of International Application No. PCT/JP2009/057140 mailed Dec. 9, 2010 with Forms PCT/IB/373 and PCT/ISA/237.

(Continued)

*Primary Examiner* — Khanh P Nguyen
*Assistant Examiner* — Carson Gross
(74) *Attorney, Agent, or Firm* — Westerman, Hattori, Daniels & Adrian, LLP

(57) ABSTRACT

An optical display device manufacturing system for bonding a first optical member to an optical display unit, comprising an excluding device for excluding a second optical member as an object to be excluded from a long release film that carries the first and second optical members, wherein the excluding device includes a tape member; a tape member rolling means on which the tape member is rolled; a roller for exclusion around which the tape member unrolled from the tape member rolling means is wound; a drive mechanism for shifting the roller for exclusion; and a take-up means for taking up the tape member wound around the roller for exclusion, wherein the excluding device being configured so that when the roller for exclusion is shifted, the second optical member is attached to the tape member and taken up.

13 Claims, 8 Drawing Sheets

U.S. PATENT DOCUMENTS

| | | |
|---|---|---|
| 2004/0095526 A1 | 5/2004 | Yamabuchi et al. |
| 2004/0169809 A1 | 9/2004 | Yamabuchi et al. |
| 2007/0013858 A1 | 1/2007 | Yamabuchi et al. |
| 2009/0159175 A1 | 6/2009 | Nakahira et al. |
| 2009/0199950 A1 | 8/2009 | Kitada et al. |
| 2010/0288441 A1 | 11/2010 | Kitada et al. |

FOREIGN PATENT DOCUMENTS

| | | | |
|---|---|---|---|
| JP | 57-52017 | * | 3/1982 |
| JP | 57-052017 A | | 3/1982 |
| JP | 11-333929 A | | 12/1999 |
| JP | 2007-140046 A | | 6/2007 |
| TW | 2003-02935 A | | 8/2003 |
| WO | 2008/047712 A1 | | 4/2008 |

OTHER PUBLICATIONS

European Search Report dated Feb. 14, 2011, issued in corrrersponding European Patent Application No. 09731115.3.
International Search Report of PCT/JP2009/057140, Mailing Date of Jul. 14, 2009.
Taiwanese Search Report dated Sep. 24, 2010, issued in corresponding Taiwanese Patent Application No. 098111713.

* cited by examiner

The press roller 181 is elevated, the roller for exclusion 192 is returned to the original position, and the press roller 181 is elevated to be returned to the original position. The knife edge 171 is rotated to be returned to the original position.

The press roller 281 is elevated, the roller for exclusion 292 is returned to the original position, and the guide roller 282 is returned to the original position.

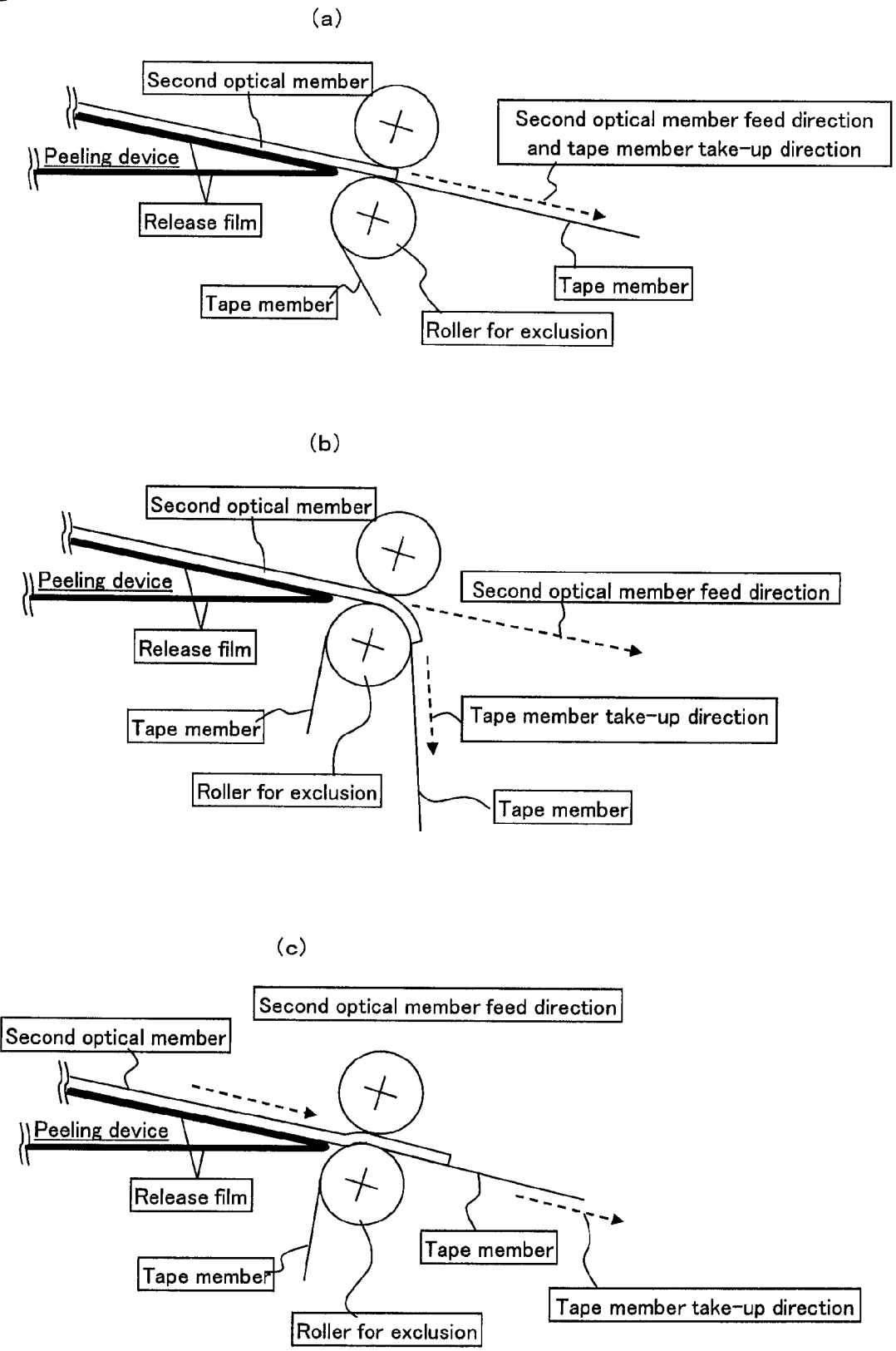

MANUFACTURING SYSTEM FOR AN OPTICAL DISPLAY DEVICE, MANUFACTURING METHOD FOR AN OPTICAL DISPLAY DEVICE, EXCLUDING DEVICE AND EXCLUDING METHOD

TECHNICAL FIELD

The invention relates to an excluding device for excluding an object to be excluded. The invention also relates to optical display device manufacturing system and method for bonding an optical member to an optical display unit using the excluding device for excluding an object to be excluded.

BACKGROUND ART

A conventional defect excluding device is known which performs a process that includes feeding, in the longitudinal direction, a long polarizing plate having a pressure-sensitive adhesive layer protected by a separator, inspecting the polarizing plate for defects in the course of the feeding, cutting the defect-containing polarizing plate portion, while leaving the separator uncut, and excluding the defect-containing polarizing plate portion (see Patent Document 1).

As shown in FIGS. 4 to 8 of Patent Document 1, a defect excluding device (15) includes a peeling claw (29) that is placed above a polarizing plate tape (3) and swingable around a pivot (28), a cylinder (30) to allow the peeling claw (29) to swing, and a film (31) that runs immediately above the polarizing plate tape (3) in the reverse direction and receives a defective polarizing plate (4a) on the upper side of the peeling claw (29) so that the defective polarizing plate (4a) is transferred thereto. When the sensor (25) of a defect detecting device (14) detects a defect (3a), the cylinder (30) is driven to extend, and the peeling claw (29) is downwardly rotated so that its tip pushes down the polarizing plate tape (3). The polarizing plate tape (3) is bent between the tip and the front end of an edge receiving stage (22), so that the defective polarizing plate (4a) going forward is peeled off from a separator (6) at the bent portion. As a result of the action, the defective polarizing plate (4a) is transferred to the film (31) on the peeling claw (29) and therefore removed. The characters in the parentheses correspond to those shown in FIGS. 4 to 8 of Patent Document 1.

PRIOR ART DOCUMENT

Patent Document

Patent Document 1: Japanese Patent Application Laid-Open (JP-A) No. 57-52017 (claim 1 and FIGS. 4 to 8).

DISCLOSURE OF INVENTION

Problems to be Solved by the Invention

In the system disclosed in Patent Document 1, however, the tip of the peeling claw (29) has an acute angle, and therefore, the polarizing plate tape (3) may be damaged when the tip of the peeling claw (29) is pressed against the polarizing plate tape (3). If a certain trigger such as a cut line is formed in the separator (6) in the cutting process, over-tension may be caused by pressing the peeling claw (29) against the film (31) with a certain tension applied to the polarizing plate tape (3), which may result in a trouble such as a rupture of the film (31). A bent portion has to be formed in the separator (6) using the tip of the peeling claw (29). However, if the tip of the peeling claw (29) is pressed against the non-defective polarizing plate tape (3), the polarizing plate tape (3) can be undesirably damaged. On the other hand, if the tip of the peeling claw (29) is pressed against the defective polarizing plate tape, the defective polarizing plate tape may fail to be separated. Unless the tip of the peeling claw (29) is precisely pressed against the cutting stripe (cut line), the defective polarizing plate tape cannot be peeled off. Therefore, the movement of the peeling claw (29) needs to be precisely controlled. In addition to the high-accuracy control of the peeling claw (29) movement, the width of the cutting stripe needs to be widened. In addition, since the feed direction of the peeling claw (29) is reverse to that of the separator (6), the contact surface of the pressure-sensitive adhesive layer of the separator (6) and the contact surface of the pressure-sensitive adhesive layer of the discharging film (31) being fed in opposite directions may rub against each other at the tip of the peeling claw, so that failures such as a rupture, scratches, and adhesive dirt may occur on the separator (6) or the film (31).

The invention has been made under the circumstances described above, and an object of the invention is to provide an excluding device capable of precisely excluding an object to be excluded with a simple mechanism. Another object of the invention is to provide an optical display device manufacturing system having an excluding device, for example, in which a defective optical member can be properly removed so as not to be bonded to an optical display unit in the process of bonding an optical member to the optical display unit, and to provide an optical display device manufacturing method using such an excluding device.

Means for Solving the Problems

As a result of investigations to solve the above problems, the invention described below has been completed.

The invention is directed to an optical display device manufacturing system for bonding a first optical member to an optical display unit, comprising an excluding device for excluding a second optical member as an object to be excluded from a long release film that carries the first and second optical members,
  the excluding device including:
  a tape member;
  a tape member rolling means on which the tape member is rolled;
  a roller for exclusion around which the tape member unrolled from the tape member rolling means is wound;
  a drive mechanism for shifting the roller for exclusion; and
  a take-up means for taking up the tape member wound around the roller for exclusion,
  the excluding device being configured so that when the roller for exclusion is shifted, the second optical member is attached to the tape member and taken up.

In this embodiment, the optical display device manufacturing system includes an excluding device, which makes it possible to exclude the second optical member as an object to be excluded in a satisfactory manner. The excluding device includes a tape member, tape member rolling means on which the tape member is rolled, a roller for exclusion around which the tape member unrolled from the tape member rolling means is wound, a drive mechanism for shifting the roller for exclusion, and take-up means for taking up the tape member wound around the roller for exclusion.

In the excluding device, the roller for exclusion is shifted to the excluding position, and the tape member wound around the roller for exclusion is attached to the second optical member as an object to be excluded so that the tape member and the second optical member adhering thereto can be taken up by the take-up means. Therefore, the second optical member can be excluded in a suitable manner using a device with a simple configuration. In addition, members other than the second optical member undergo substantially no deformation such as bending and therefore are prevented from being damaged. Unlike the tip of the peeling claw disclosed in Prior Art Document 1, the roller for exclusion has no angular cross-sectional shape (preferably has a circular cross-sectional shape), and the second optical member is attached to the tape member wound around the roller for exclusion. Therefore, the risk of damage to the first optical member or any other member is avoided.

Examples of the "tape member" include various films, pressure-sensitive adhesive tapes, and adhesive tapes. When a pressure-sensitive adhesive tape or an adhesive tape is used as the tape member, the pressure-sensitive adhesive or adhesive surface of the pressure-sensitive adhesive or adhesive tape only has to act on a part of the object to be excluded. In contrast to the prior art, therefore, there is no need to perform high-accuracy control of the roller for exclusion operation, which can make the operation control mechanism simple. When a film having no pressure-sensitive adhesive surface is used as the tape member, the device may be configured so that a pressure-sensitive adhesive layer or an adhesive layer formed in the object to be excluded may be attached to the film. Also in this case, there is no need to perform high-accuracy control of the roller for exclusion operation, in contrast to the prior art, and therefore, the operation control mechanism can be made simple. When a film having no pressure-sensitive adhesive surface is used as the tape member, the film may be the long release film, which is reused after the optical member is subjected to the bonding process.

In an embodiment of the invention, the optical display device manufacturing system may further comprising a cutting device that cuts a long optical member in a long laminated optical member including at least the long release film and the long optical member placed thereon, while leaving the long release film uncut, wherein the first and second optical members are obtained by cutting the long optical member with the cutting device.

Among the components of the long laminated optical member, the long optical member may be cut, while the long release film may be left uncut (without cutting the long release film). In this case, the cutting position is preferably controlled based on information about defects in the optical member. The defect information includes positional information, defect type and so on, which may be previously attached to the long release film by printing or the like or may be obtained by defect inspection before cutting. The optical member having any defect may be excluded without being bonded to the optical display unit. In this case, the device may be configured so that the optical member may be excluded according to the defect information. The object to be excluded is not only a defective optical member, but also, for example, an optical member to be excluded as needed for the purpose of quality test or operation condition test.

In an embodiment of the invention, the manufacturing system or method preferably includes peeling off the long release film from the laminated optical member with a peeling device, before cutting the long optical member of the long laminated optical member while leaving the long release film uncut (without cutting the long release film); inspecting the laminated optical member for defects with a defect inspection device, after peeling off the long release film; after the defect inspection, bonding a new long release film to the laminated optical member with the pressure-sensitive adhesive layer interposed therebetween; performing a cutting process with a cutting device based on the result of the defect inspection; and performing an excluding process with the excluding device based on the result of the defect inspection.

According to this feature, the optical member of the laminated optical member can be inspected for defects after the removal of the long release film. Therefore, the optical member can be inspected for defects without the need to take into account the inherent retardation of the release film and defects in the release film, such as foreign matter or scratches deposited on or present in the release film. How to perform the defect inspection is described below.

When any defect is detected and the optical member is determined to be defective in the defect inspection, the optical member is cut into a specific size so that the defective portion of the optical member can be separated (this process is also referred to as skip cutting), and the defective portion is removed (removed). This can significantly improve the yield of the optical member.

In an embodiment of the invention, the second optical member may be placed on the long release film with a pressure-sensitive adhesive layer interposed therebetween, the tape member may have a non-adhesive surface, and the excluding device may attach the second optical member to the non-adhesive surface through the pressure-sensitive adhesive layer.

In an embodiment of the invention, the optical device manufacturing system may further include a peeling device for peeling off the long release film from the second optical member by winding the long release film. According to this feature, the second optical member is fed from the peeling device, so that in the excluding process, the second optical member can be attached to the tape member by shifting the roller for exclusion to an appropriate position with no contact between the tape member and the release film. Thus, the risk of damage to the first optical member can be further reduced.

For example, the peeling device preferably has a knife edge part. In this case, the peeling device may also include a rotation mechanism to make the front end of the knife edge rotatable and rotation control means (these correspond to rotation means). For example, the peeling device may include a set of two or more rollers, in which a roller may have a small diameter so as to have a shape close to the front end shape of a knife edge, so that it can function like the front end of the knife edge.

In an embodiment of the invention, the peeling device may be configured to peel off the long release film also from the first optical member by winding the long release film, when the first optical member is bonded to the optical display unit. When the peeling device also functions to peel off the release film from the first optical member, the whole of the manufacturing system is designed to be highly functional, which is highly effective in reducing the cost of the manufacturing system.

In an embodiment of the invention, the drive mechanism may be configured to shift the roller for exclusion to such a position that a front portion of the second optical member fed from the peeling device is attached to the tape member on the take-up means side and a rear portion of the second optical member is attached to the tape member on the tape member rolling means side. For example, as shown in parts (a) to (c) of FIG. 10, a front portion of the second optical member may be attached to the tape member on the take-up means side, and a rear portion of the second optical member may be attached to the tape member on the tape member rolling means side. Part (a) of FIG. 10 is a schematic diagram showing that the feed direction of the second optical member separated from the release film is the same or substantially the same as the take-up direction of the tape member. Part (b) of FIG. 10 is a schematic diagram showing that the take-up direction of the tape member is substantially downwardly perpendicular to the feed direction of the second optical member. Part (c) of FIG. 10 is a schematic diagram showing that the roller for exclusion is placed to push the second optical member being fed, so that the front end portion of the second optical member is attached to the tape member wound around the pushing roller for exclusion. According to these features, the feed direction of the second optical member from the peeling device substantially accords with the take-up direction of the tape member, so that the second optical member can be properly attached to the tape member.

In an embodiment of the invention, the tape member take-up speed of the take-up means may be synchronized with the speed of feeding the second optical member from the peeling device. If the speed of taking up the tape member differs from the speed of feeding the second optical member as an object to be excluded, distortion created by the speed difference may cause some troubles. For example, if the speed of taking up the tape member is higher than the speed of feeding the second optical member, some troubles may occur, such as a rupture of the tape member, and misalignment of the first optical member bonded to the optical display unit, which may occur when the release film is pulled. If the speed of taking up the tape member is lower than the speed of feeding the second optical member, the tape member may loosen, or the second optical member may wind around any other roll or mechanical part. According to this feature, therefore, these speeds should be synchronized with each other so that the troubles can be well prevented. For "synchronization," the speeds may be set completely equal to each other with no difference, or the speeds may be synchronized, taking into account the device error. For example, the difference in speed may be in the range of −3% to 3%, preferably −1% to 1% of any one of the speeds. For example, the synchronization control method includes controlling the rotational speed of the tape member take-up roller and the speed of the release film feed roller to synchronize them with each other. For example, servomotors may be used to drive and rotate the take-up roller and the feed roller, and the servomotors may be synchronously controlled by a controller so that they can simultaneously rotate at the same speed.

In an embodiment of the invention, the process of excluding the second optical member from the long release film may include:

temporarily stopping the feeding of the long release film, when at least a front portion of the second optical member is fed from the peeling device;

attaching at least the front portion of the second optical member to the tape member, while the take-up of the tape member by the take-up means is stopped; and starting the feeding of the long release film at the same time as starting the take-up of the tape member by the take-up means. According to this feature, the same advantageous effect can be achieved as in the case that the speed of taking up the tape member is synchronized with the speed of feeding the second optical member.

In an embodiment of the invention, in the process of taking up the tape member to which the nth piece (wherein n is a natural number) of the second optical member is attached, the take-up means may stop the take-up, after it takes up the tape member to such a position that the nth piece of the second optical member and the (n+1)-th piece of the second optical member do not overlap, at least partially. According to this feature, the second optical member can be prevented from dropping off, and the tape member and so on can be prevented from being wasted. More preferably, the tape member may be taken up to such a position that they are entirely apart from each other. For example, the nth piece of the second optical member is preferably about 3 mm apart from the (n+1)th piece of the second optical member.

In an embodiment of the invention, the excluding device may be configured to attach the second optical member to the tape member at a position away from above the optical display unit. When the excluding device is configured so that the bonding between the tape member and the second optical member is not performed above the optical display unit, foreign matter and so on can be prevented from being deposited on the surface of the optical display unit during the excluding process. In addition, when the excluding device is configured so that the tape member does not come into contact with the optical display unit, breakage or the like of the optical display unit can be prevented. More specifically, for example, such a configuration may be achieved by a method of placing the excluding device in such a manner that it does not work in the space above the optical display unit being fed or by a method of stopping the feeding of the optical display unit in such a manner that the optical display unit is not located below the excluding device during the excluding process.

In an embodiment of the invention, the excluding device may be configured to attach the second optical member to the tape member at a position below the optical display unit. When the bonding between the tape member and the second optical member is performed below the optical display unit, foreign matter and so on can be prevented from being deposited on the surface of the optical display unit during the excluding process. More specifically, for example, such a configuration may be achieved by a method of placing the excluding device below the position at which the optical display unit is to be fed or by a method of determining the position of the working tape member and the position of the second optical member to be peeled off from the release film in such a manner that the tape member and the second optical member can be bonded together at a position below the optical display unit.

In an embodiment of the invention, the optical display device manufacturing system may further include a pair of bonding rollers for bonding the first optical member to the optical display unit, wherein the second optical member may be caught between one of the bonding rollers and the roller for exclusion so that the second optical member can be attached to the tape member.

According to this feature, the use of one of the bonding rollers can reduce the cost of the manufacturing system.

In an embodiment of the invention, the manufacturing system may further include rotation means for rotating the peeling device, and the peeling device may be configured so that in the process of bonding the first optical member to the optical display unit, it can feed the first optical member to a bonding position where the first optical member can be bonded to the optical display unit, while it peels off the release film from the first optical member, wherein in the process of excluding the second optical member from the release film, the rotation means may downwardly rotate the front end of the peeling device so that the peeling device can peel off the release film from the second optical member and that the second optical member can be fed to an excluding position lower than the bonding position and can be attached to the tape member.

According to this feature, the rotation means can properly control the position of the rotated peeling device so that the first optical member separated from the release film can be fed to the bonding position where it can be bonded to the optical display unit and that the second optical member can be fed to the excluding position lower than the bonding position.

Another embodiment of the invention is directed to a method for manufacturing an optical display device, including the steps of:

bonding a first optical member to an optical display unit; and excluding a second optical member as an object to be excluded from a long release film that carries the first and second optical members, the excluding step including:

a process of shifting a roller for exclusion around which a tape member unrolled from a tape member rolling means is wound;

a process of attaching the second optical member to the tape member; and a process of taking up the second optical member-carrying tape member by a take-up means.

This method brings about the same advantageous effects as the manufacturing system described above, and the embodiments described below also bring about the same advantageous effects. The manufacturing method of the invention may be achieved using the manufacturing system described above or using other means.

The optical display device manufacturing method may further include, before the excluding step, the step of cutting a long optical member in a long laminated optical member including at least the long release film and the long optical member placed thereon, while leaving the long release film uncut, wherein the first and second optical members may be obtained by cutting the long optical member without cutting the long release film in the cutting step.

In an embodiment of the invention, the second optical member may be placed on the long release film with a pressure-sensitive adhesive layer interposed therebetween, the tape member may have a non-adhesive surface, and in the attaching process, the second optical member may be attached to the non-adhesive surface through the pressure-sensitive adhesive layer.

In an embodiment of the invention, the optical display device manufacturing method may further include a process of peeling off the long release film from the second optical member by hooking the long release film on a peeling device.

In an embodiment of the manufacturing method, the bonding step may further include a process of peeling off the long release film from the first optical member by winding the long release film on the peeling device.

In an embodiment of the manufacturing method, in the shifting process, the roller for exclusion may be shifted to such a position that a front portion of the second optical member fed from the peeling device in the peeling process may be attached to the tape member on the take-up means side and a rear portion of the second optical member can be attached to the tape member on the tape member rolling means side.

In an embodiment of the manufacturing method, the speed of taking up the tape member in the taking-up process may be synchronized with the speed of feeding the second optical member from the peeling device in the peeling process.

In an embodiment of the manufacturing method, the step of excluding the second optical member from the long release film may include:

temporarily stopping the feeding of the long release film, when at least a front portion of the second optical member is fed from the peeling device in the peeling process;

attaching at least the front portion of the second optical member to the tape member, while the take-up of the tape member is stopped in the taking-up process; and starting the feeding of the long release film at the same time as starting the take-up of the tape member in the taking-up process.

In an embodiment of the manufacturing method, in the process of taking up the tape member to which the nth piece (wherein n is a natural number) of the second optical member is attached, the take-up may be stopped, after the tape member is taken up to such a position that the nth piece of the second optical member and the (n+1)th piece of the second optical member do not overlap, at least partially.

In an embodiment of the manufacturing method, in the attaching process, the second optical member may be attached to the tape member at a position away from above the optical display unit.

In an embodiment of the manufacturing method, in the attaching process, the second optical member may be attached to the tape member at a position below the optical display unit.

In an embodiment of the manufacturing method, in the bonding step, the optical display unit and the first optical member may be caught between a pair of bonding rollers so that the first optical member can be bonded to the optical display unit, and in the attaching process, the second optical member may be caught between one of the bonding rollers and the roller for exclusion so that the second optical member can be attached to the tape member.

In an embodiment of the manufacturing method, rotation means for rotating the peeling device may be further provided, and the peeling device may be configured so that in the process of bonding the first optical member to the optical display unit, it can feed the first optical member to a bonding position where the first optical member can be bonded to the optical display unit, while it peels off the release film from the first optical member, wherein in the process of excluding the second optical member from the release film, the rotation means may downwardly rotate the front end of the peeling device so that the peeling device can peel off the release film from the second optical member and that the second optical member can be fed to an excluding position lower than the bonding position and can be attached to the tape member.

In the manufacturing system or method described above, for example, the process of bonding a non-defective optical member to the optical display unit and the process of rejecting a defective optical member without bonding it to the optical display unit can be performed continuously. For example, the optical display unit may be horizontally laid, and the first optical member may be bonded to the floor side-surface of the optical display unit. In this case, for example, the defective second optical member may be excluded on a side closer to the floor than the bonding position. In this case, the excluding device may be placed on a side closer to the floor than the optical display unit, so that the second optical member as an object to be excluded can be easily recovered. If the excluding device is provided on a side closer to the ceiling than the optical display unit, the object to be excluded cannot easily be recovered, and some foreign matter intruding during the recovery may undesirably drop onto the optical display unit. The invention is also effective and advantageous, even when the first optical member is bonded to the floor side-surface of the horizontally-laid optical display unit.

In another embodiment, the peeling device may have a knife edge whose front end can be rotated, and the peeling device may be configured so that it can move, toward the floor, away from the position where the optical display unit is bonded. In a further embodiment, the peeling device may have a knife edge whose front end cannot be rotated, and the peeling device may be configured so that it can move, toward the floor, away from the position where the optical display unit is bonded.

In a further embodiment, for example, the process of excluding the object to be excluded may include: placing a roller for exclusion at the front end portion of the knife edge of the peeling device, while maintaining the direction of the front end of the knife edge; hooking the release film on the knife edge to allow it to turn around so that the release film can be peeled off from the object to be excluded; allowing the object to be excluded to adhere to the adhesive surface of the tape member wound around the roller for exclusion; and excluding the adhering object to be excluded by taking up the tape member.

According to this feature, the object to be excluded can be attached to the tape member by shifting the roller for exclusion to the front end portion of the knife edge without changing the direction of the front end of the knife edge.

In an embodiment of the invention, first optical members may be bonded to both sides of the optical display unit. In this case, the same peeling and bonding devices as those described above may be used. For example, the excluding device may be placed on a side closer to the floor than the optical display unit. The optical display feeding mechanism preferably has a rotation mechanism so that before the first optical member is bonded, the optical display unit can be turned by 90° so that the previously bonded first optical member can have a crossed Nicols relationship with the newly bonded first optical member.

In an embodiment of the invention, the optical display device may include the optical display unit and the first optical member or members bonded to one or both sides of the optical display unit. Examples of the optical display device include a liquid crystal display and an organic electroluminescent (EL) display. Examples of the optical display unit include a liquid crystal cell-glass substrate unit (also called liquid crystal panel) and an organic EL cell-organic EL light-emitting unit. Preferably, the optical display unit has previously undergone a cleaning process, before the first optical member is bonded to it.

The optical display device manufacturing method of the invention may further include the step of inspecting the bonded state, after the bonding of the first optical member or members to one or both sides of the optical display unit. The respective steps may be performed in a continuous manufacturing line. For example, "inspecting the bonded state" may be inspecting a laminate of the first optical member and the optical display unit for any displacement, slack, air-bubble contaminant, or the like.

The optical display device manufacturing method of the invention may further include the step of inspecting defects after the bonding of the first optical member or members to one or both sides of the optical display unit. The respective steps may be performed in a continuous manufacturing line. For example, "defects" are intended to include dirt on the surface or in the inside, scratches, a foreign substance-containing defect of a special shape such as a dented and twisted shape (also called "knick"), bubbles, foreign substances, and so on.

The invention is also directed to an excluding device for excluding an object to be excluded, including:
a tape member;
a tape member rolling means on which the tape member is rolled;
a roller for exclusion around which the tape member unrolled from the tape member rolling means is wound;
a drive mechanism for shifting the roller for exclusion; and
a take-up means for taking up the tape member wound around the roller for exclusion,
the excluding device being configured so that when the roller for exclusion is shifted, the object to be excluded is attached to the tape member and taken up.

In this device, the roller for exclusion is shifted to the excluding position, and the tape member wound around the roller for exclusion is attached to the object to be excluded so that the tape member and the object to be excluded adhering thereto can be taken up by the take-up means. Therefore, the object to be excluded can be excluded in a suitable manner using a device with a simple configuration. In addition, components other than the object to be excluded undergo substantially no deformation such as bending and therefore are prevented from being damaged. Unlike the tip of the peeling claw disclosed in Prior Art Document 1, the roller for exclusion has no angular cross-sectional shape (preferably has a circular cross-sectional shape), and the object to be excluded is attached to the tape member wound around the roller for exclusion. Therefore, the risk of damage to the object to be excluded or any other component is avoided.

For example, the object to be excluded may be an optical member that is obtained by cutting a long optical member in a long laminated optical member including a long release film and the long optical member placed thereon without cutting the long release film. The excluding device can properly remove an optical member as an object to be excluded from a long release film that carries the optical member.

In an embodiment of the excluding device, the object to be excluded may have a pressure-sensitive adhesive layer, the tape member may have a non-adhesive surface, and the excluding device may be configured to attach the object to be excluded to the non-adhesive surface through the pressure-sensitive adhesive layer. In addition to the advantageous effect described above, the tape member does not have to have any pressure-sensitive adhesive layer, which is effective in reducing the manufacturing cost of the excluding device.

In an embodiment of the excluding device, the drive mechanism may be configured to shift the roller for exclusion to such a position that a front portion of the object to be excluded is attached to the tape member on the take-up means side and a rear portion of the object to be excluded is attached to the tape member on the tape member rolling means side. For example, when the direction of taking up the tape member is the same as the direction of feeding the optical member as the object to be excluded, the tape member and the optical member or the release film do not need to be rubbed with each other, so that these members can be free from defects such as ruptures, scratches, or sticking dirt.

In an embodiment of the excluding device, the take-up means may be configured so that in the process of taking up the tape member to which the nth piece (wherein n is a natural number) of the object to be excluded is attached, the take-up means stops the take-up, after it takes up the tape member to such a position that the nth piece of the object to be excluded and the (n+1)th piece of the object to be excluded do not overlap, at least partially.

The invention is also directed to a method for excluding an object to be excluded, including:

a process of shifting a roller for exclusion around which a tape member unrolled from tape member rolling means is wound;

a process of attaching the object to be excluded to the tape member; and a process of taking up the tape member attached the object to be excluded by take-up means.

In an embodiment of the excluding method, the object to be excluded may have a pressure-sensitive adhesive layer, the tape member may have a non-adhesive surface, and in the attaching process, the object to be excluded may be attached to the non-adhesive surface through the pressure-sensitive adhesive layer.

In an embodiment of the excluding method, in the shifting process, the roller for exclusion may be shifted to such a position that a front portion of the object to be excluded is attached to the tape member on the take-up means side and a rear portion of the object to be excluded is attached to the tape member on the tape member rolling means side.

In an embodiment of the excluding method, in the process of taking up the tape member to which the nth piece (wherein n is a natural number) of the object to be excluded is attached, the take-up may be stopped, after the tape member is taken up to such a position that the nth piece of the object to be excluded and the (n+1)th piece of the object to be excluded do not overlap, at least partially.

In an embodiment of the excluding method, the object to be excluded may be an optical member obtained by cutting a long optical member in a long laminated optical member including at least a long release film and the long optical member placed thereon without cutting the long release film.

BRIEF DESCRIPTION OF DRAWINGS

FIG. 10 is a diagram for illustrating an example where a front portion of the second optical member is attached to the tape member on the take-up means side and a rear portion of the second optical member is attached to the tape member on the tape member rolling means side.

DESCRIPTION OF REFERENCE CHARACTERS

Figure 1:
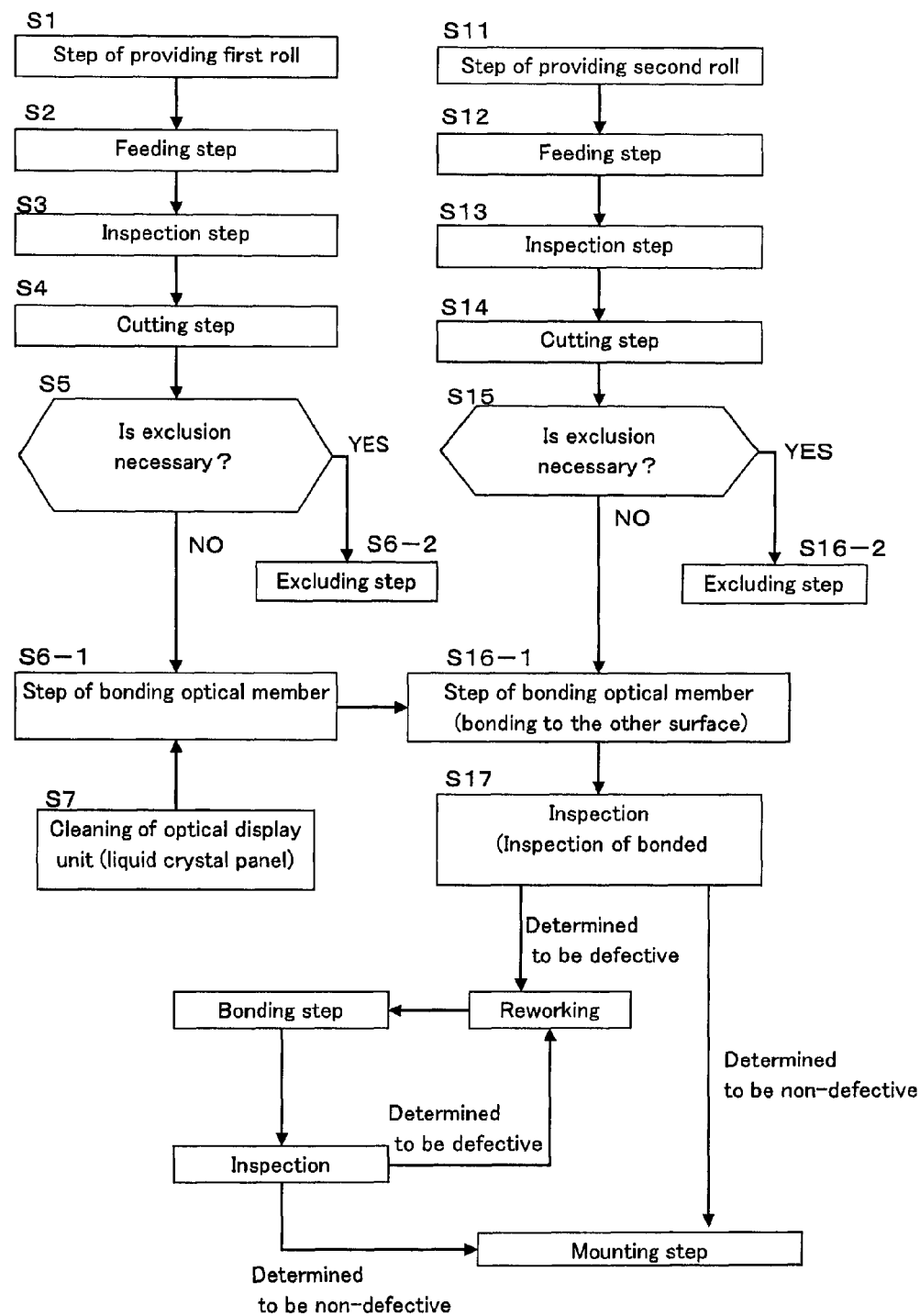
FIG. 1 is a flow chart of an optical display device manufacturing method according to Embodiment 1.

In the drawings, reference character F1 represents a first sheet material, F2 a second sheet material, F11 an optical member, F11a a first polarizer, F11b a first film, F11c a second film, F12 a first release film, F13 a surface protecting film, F14 a first pressure-sensitive adhesive layer, F21 an optical member, F21a a second polarizer, F21b a third film, F21c a fourth film, F22 a second release film, F23 a surface protecting film, F24 a second pressure-sensitive adhesive layer, 200 an object to be excluded (second optical member), W an optical display unit, W12 an optical display device, 1 a controller, 10 a polishing cleaning device, 11 a water cleaning device, 12 a first feeder, 13 a first pre-inspection peeling device, 14 a first defect inspection device, 15 a first release film bonding device, 16 a first cutting device, 17 a first peeling device, 18 a first bonding device, 19 a first excluding device, 22 a second feeder, 23 a second pre-inspection peeling device, 24 a second defect inspection device, 25 a second release film bonding device, 26 a second cutting device, 27 a second peeling device, 28 a second bonding device, 29 a second excluding device, 181 a press roller, 182 a guide roller, 191 a film for exclusion, 192 a roller for exclusion, and 193 a take-up roller.

EMBODIMENTS FOR CARRYING OUT THE INVENTION

Embodiment 1

Figure 3:
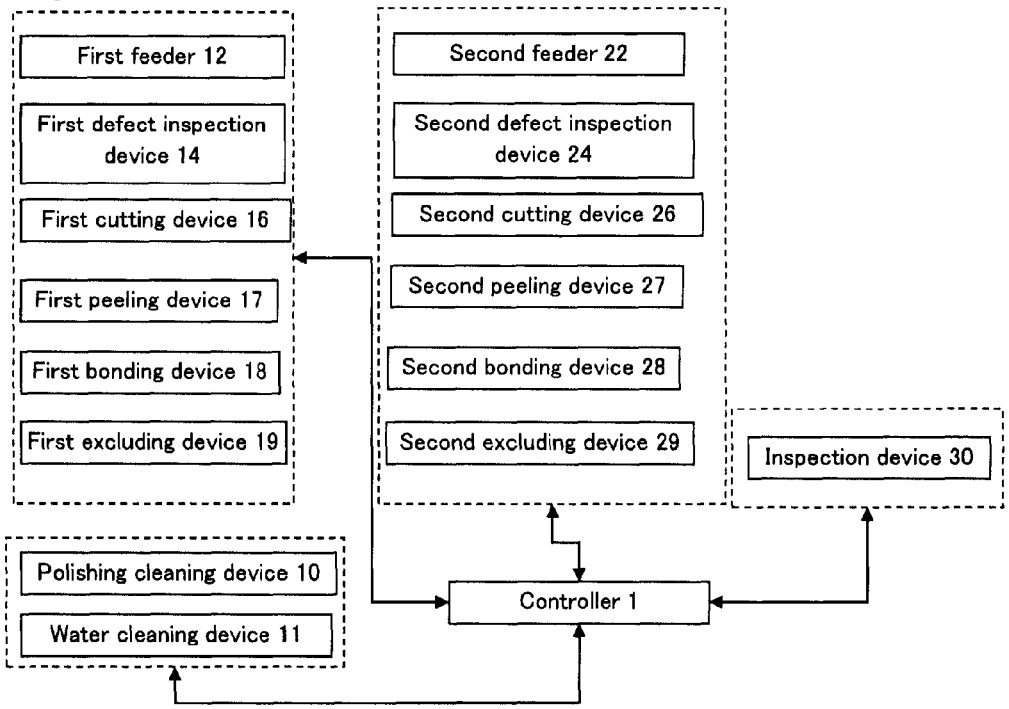
FIG. 3 is a diagram for illustrating a manufacturing system according to Embodiment 1.

Embodiment 1 of the invention is described below. FIG. 1 is a flow chart showing the method of Embodiment 1 for manufacturing an optical display device. FIG. 3 shows the main components of the optical display device manufacturing system in Embodiment 1. The manufacturing system of Embodiment 1 is an example that includes the same components as the manufacturing system of Embodiment 2 described below, except for first and second pre-inspection peeling devices 13 and 23 and first and second release film-bonding devices 15 and 25. For example, another mode of the manufacturing system of Embodiment 1 may not include a first defect inspection device 14 and/or a second defect inspection device 24. The excluding step using a first or second excluding device 19 or 29 may include not only excluding an optical component (such as a surface protecting film-carrying polarizing plate) determined to be defective but also, for example, sampling a product for process inspection or quality inspection.

Optical Display Unit

Examples of the optical display unit for use in an embodiment of the invention include a liquid crystal cell-glass substrate unit and an organic electroluminescent (EL) light-emitting unit.

Optical Member

The optical member for use in an embodiment of the invention may be a monolayer structure or a laminated structure including a laminate of two or more films. Examples of the optical member include a polarizer, a retardation film, a brightness enhancement film, and a laminated optical member including a laminate of two or more thereof. In some cases, the optical member may be a laminate further including a transparent film for protection, such as a polarizer protecting film having the function of protecting a polarizer. A release film-carrying optical member (corresponding to an example of the laminated optical member) may be formed, which includes an optical member, a pressure-sensitive adhesive formed on one side of the optical member so that the optical member can be bonded to an optical display unit, and a long release film provided to protect the pressure-sensitive adhesive. A surface protecting film may also be placed on the opposite uppermost surface of the optical member from the surface on which the long release film is formed. Hereinafter, the surface protecting film and the release film-carrying optical member (corresponding to an example of the laminated optical member) are referred to as sheet materials).

Production Flow Chart

In the description below, the optical member that is fed from a roll material so as to be subjected to a cutting process is also called a long optical member. In addition, the optical member to be bonded to an optical display unit W is called the first optical member, and the optical member to be excluded without being bonded to the optical display unit (object to be excluded) is called the second optical member. Whether or not to remove the object may be determined based on the result of defect inspection or on the operator's instructions for rejection. Embodiments are shown below, in which it is determined based on the result of defect inspection.

Figure 9:
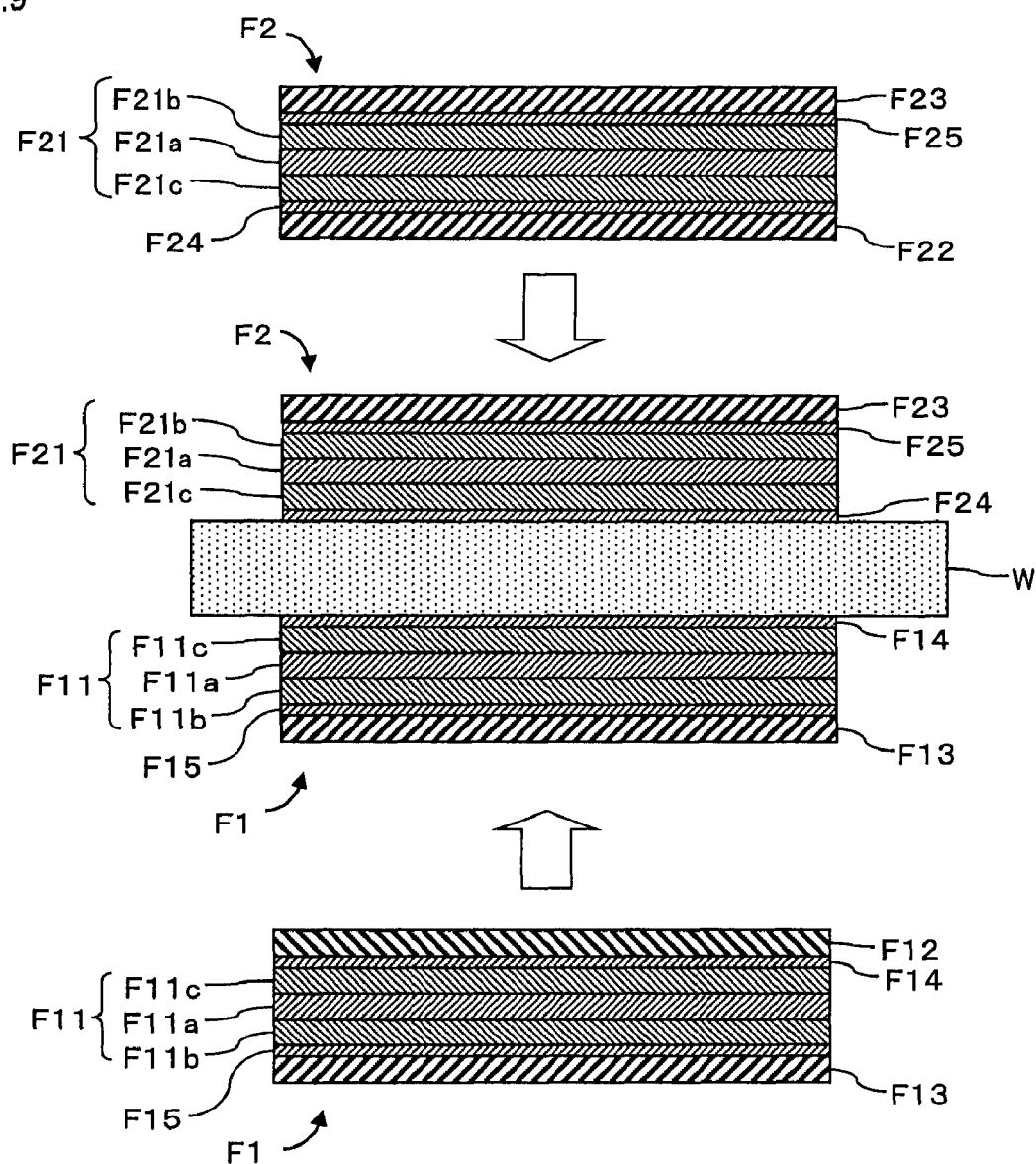
FIG. 9 is a diagram for illustrating the laminated structure of a laminated optical member.

(1) Step of Providing First Material Roll (S1 in FIG. 1). A first roll of a first long sheet material (first laminated optical member) is provided. The width of the first roll depends on the size of the optical display unit to be bonded. As shown in FIG. 9, the laminated structure of the first sheet material F1 includes an optical member F11, a first release film F12 and a surface protecting film F13. The first optical member F11 includes a first polarizer F11a, a first film F11b provided on one side thereof with an adhesive layer (not shown) interposed therebetween, and a second film F11c provided on the other side thereof with an adhesive layer (not shown) interposed therebetween. The optical member F11 may be provided with a protecting film only on one side of it, while the other side may be protected by a release film with a pressure-sensitive adhesive layer interposed therebetween.

For example, the first and second films F11b and F11c are polarizer protecting films (such as triacetyl cellulose films or PET films). The second film F11c is to be bonded to the surface of the optical display unit with a first pressure-sensitive adhesive F14 interposed therebetween. The first film F11b may undergo a surface treatment. Examples of the surface treatment include a hard coating treatment, an antireflection treatment, and a treatment for any other purpose such as anti-sticking, diffusion or antiglare purpose. The first release film F12 is provided on the second film F11c with the first pressure-sensitive adhesive layer F14 interposed therebetween. The surface protecting film F13 is provided on the first film F11b with a pressure-sensitive adhesive layer F15 interposed therebetween. The specific structure of the first and second films F11b and F11c is described below. Hereinafter, a laminated structure of a polarizer and a polarizer protecting film is also refereed to as a polarizing plate.

In a factory, each step described below is performed in an isolated structure with cleanliness maintained. In particular, it is important to maintain cleanliness in the step of bonding the optical member to the optical display unit.

(2) Feeding Step (S2 in FIG. 1). The first sheet material (first laminated optical member) F1 is fed to the downstream side from the first roll provided and placed. For example, a first feeder 12 to feed the first sheet material F1 includes a pair of nip rollers, a tension roller, a rotary drive, an accumulator A, a sensor, a controller, and so on.

(3) First Inspecting Step (S3 in FIG. 1). The first sheet material F1 is inspected for defects with a first defect inspection device 14. The defect inspection method may be a method of performing imaging and image processing on both sides of the first sheet material F1 with transmitted light or reflected light, a method of performing imaging and image processing with a polarizing film for inspection arranged in crossed Nicol relation (also referred to as "0° cross") with the polarization axis of the polarizing plate (the object to be inspected) between a CCD camera and the object, or a method of performing imaging and image processing with a polarizing film for inspection arranged at a certain angle (for example, in the range of more than 0° to 10°, also referred to as "X° cross") with the polarization axis of the polarizing plate (the object to be inspected) between a CCD camera and the object. Known methods may be used for the image processing algorithm. For example, defects may be detected by grayscale determination based on binarization.

Defect information detected by the first defect inspection device 14 is associated with the positional information (such as position coordinates) and sent to a controller 1 so that it can contribute to the cutting process with a first cutting device 16 as described below.

(4) First Cutting Step (S4 in FIG. 1). The first cutting device 16 cuts each of the surface protecting film F13, the pressure-sensitive adhesive layer F15, the optical member F11, and the first pressure-sensitive adhesive layer F14 into a specific size with leaving the first release film F12 uncut (without cutting the first release film F12.) Among the optical members obtained by cutting, the optical member to be bonded to the optical display unit W is called the first optical member, while the optical member to be excluded is called the second optical member. For example, the cutting means may be a laser, a cutter, or any other known cutting means. The cutting means may be configured so that defects can be separated by cutting based on the defect information obtained by the first defect inspection device 14. This can significantly improve the yield of the optical member. The system may be configured so that the second optical member containing any defect (the object to be excluded) can be excluded by a first excluding device 19 as described below so as not to be bonded to the optical display unit W.

(5) Determination of Non-Defective Material (S5 in FIG. 1). Whether or not the material is defective is determined as a result of the defective inspection by the first defect inspection device 14. Criteria for determining whether the material is non-defective are preset, for example, depending on the number of defects per predetermined area, the size of defects, and the type of defects. As the accuracy required of display performance increases, the non-defective criteria become stricter.

(6) Step of Bonding First Optical Member (S6-1 in FIG. 1). The optical member F11 determined to be non-defective by the defect inspection (corresponding to the first optical member) is subjected to a bonding step. In this step, the surface protecting film F13-carrying first optical member F11 is bonded to the floor side-surface of the optical display unit W, which is horizontally laid. As a result, the first optical member is bonded to one side of the optical display unit W.

While the first release film F12 is removed using a first peeling device 17 (peeling step), the first optical member F11, from which the first release film F12 has been removed, is bonded to the optical display unit W with the first pressure-sensitive adhesive layer F14 interposed therebetween using a first bonding device 18. In the bonding step, the first optical member F11 and the optical display unit W are press-bonded as described below between a press roller 181 and a guide roller 182, which form a pair of bonding rollers.

(7) Step of Excluding Second Optical Member (Object to be excluded) (S6-2 in FIG. 1). The optical member F11 determined to be defective by the defect inspection (corresponding to the second optical member) is sent as an object to be excluded to an excluding process. Specific procedures for the excluding process are described below.

(8) Cleaning Step (S7 in FIG. 1). As shown in FIG. 3, the surface of the optical display unit W is cleaned using a polishing cleaning device 10 and a water cleaning device 11. The cleaned optical display unit W is transported to the first bonding device by a feeding mechanism. For example, the feeding mechanism includes a plurality of feed rollers, a feed direction-switching mechanism, a rotary drive, a sensor, a controller, and so on.

All of the step of providing the first material roll, the first inspecting step, the first cutting step, the step of bonding the first optical member, and the cleaning step are preferably performed in a continuous manufacturing line. In the above series of manufacturing steps, the first optical member F11 is bonded to one side of the optical display unit. The description below provides the manufacturing steps for bonding an optical member to the other side in a similar manner. Also in the description below, the optical member to be bonded to the optical display unit is called the first optical member, and the optical member to be excluded without being bonded to the optical display unit (object to be excluded) is called the second optical member.

(9) Step of Providing Second Material Roll (S11 in FIG. 1). A second roll of a second long sheet material (second laminated optical member) is provided. As shown in FIG. 9, the laminated structure of the second sheet material F2 may be the same as, but not limited to, that of the first sheet material F1. The second sheet material F2 includes an optical member F21, a second release film F22 and a surface protecting film F23. The optical member F21 includes a second polarizer 21a, a third film F21b provided on one side thereof with an adhesive layer (not shown) interposed therebetween, and a fourth film F21c provided on the other side thereof with an adhesive layer (not shown) interposed therebetween. The optical member F21 may be provided with a protecting film only on one side of it, while the other side may be protected by a release film with a pressure-sensitive adhesive layer interposed therebetween.

For example, the third and fourth films F21b and F21c are polarizer protecting films (such as triacetyl cellulose films or PET films). The fourth film F21c is to be bonded to the surface of the optical display unit with a second pressure-sensitive adhesive layer F24 interposed therebetween. The third film F21b may undergo a surface treatment. Examples of the surface treatment include a hard coating treatment, an antireflection treatment, and a treatment for any other purpose such as anti-sticking, diffusion or antiglare purpose. The second release film F22 is provided on the fourth film F21c with a second pressure-sensitive adhesive layer F24 interposed therebetween. The surface protecting film F23 is provided on the third film F21b with a pressure-sensitive adhesive layer F25 interposed therebetween. The specific structure of the third and fourth films F21b and F21c is described below.

(10) Feeding Step (S12 in FIG. 1). The second sheet material F2 is fed to the downstream side from the second roll provided and placed. For example, a second feeder 22 to feed the second sheet material F2 includes a pair of nip rollers, a tension roller, a rotary drive, an accumulator A, a sensor, a controller, and so on.

(11) Second Inspecting Step (S13 in FIG. 1). The second sheet material F2 is inspected for defects with a second defect inspection device 24. The defect inspection method in this step may be the same as the above method using the first defect inspection device.

(12) Second Cutting Step (S14 in FIG. 1). A second cutting device 26 cuts each of the surface protecting film F23, the pressure-sensitive adhesive layer F25, the optical member F21, and the second pressure-sensitive adhesive layer F24 into a specific size with leaving the second release film F22 uncut (without cutting the second release film F22.) Among the optical members obtained by cutting, the optical member to be bonded to the optical display unit W is called the first optical member, while the optical member to be excluded is called the second optical member. For example, the cutting means may be a laser, a cutter, or any other known cutting means. The cutting means may be configured so that defects can be separated by cutting based on the defect information obtained by the second defect inspection device 24. This can significantly improve the yield of the optical member. The system may be configured so that the optical member F21 containing any defect (the object to be excluded) can be excluded by a second excluding device 19 as described below so as not to be bonded to the optical display unit W.

(13) Determination of Non-Defective Material (S15 in FIG. 1). Whether or not the material is defective is determined as a result of the defective inspection by the second defect inspection device 24. Criteria for determining whether the material is non-defective are preset, for example, depending on the number of defects per predetermined area, the size of defects, and the type of defects. As the accuracy required of display performance increases, the non-defective criteria become stricter.

(14) Step of Bonding First Optical Member (S16-1 in FIG. 1). The optical member F21 determined to be non-defective by the defect inspection (corresponding to the first optical member) is subjected to a bonding step. In this step, the surface protecting film-carrying first optical member F21 is bonded to the ceiling side-surface of the optical display unit W, which is horizontally laid. As a result, the optical members (each carrying the surface protecting film) are provided on both sides of the optical display unit W.

While the second release film F22 is removed using a second peeling device 27 (peeling step), the first optical member F21, from which the second release film F22 has been removed, is bonded to the optical display unit W1 with the second pressure-sensitive adhesive layer F24 interposed therebetween using a second bonding device 28. Before the first optical member F21 is bonded to the optical display unit W1, the optical display unit W1 may be turned by 90° by the feed direction-switching mechanism of the feeding mechanism so that the polarizer of the first optical member F11 and the polarizer of the optical member F21 can have a crossed Nicols relationship. In the bonding step, the first optical member F21 and the optical display unit W1 are press-bonded as described below between a pair of bonding rollers 281 and 282. As described above, the first optical members F11 and F21 are bonded to one side and the other side of the optical display unit W, respectively, so that an optical display device W12 is manufactured, which has the optical members (carrying the surface protecting film) provided on both sides.

(15) Step of Excluding Second Optical Member (Object to be excluded) (S16-2 in FIG. 1). The optical member F21 determined to be defective by the defect inspection (corresponding to the second optical member) is sent as an object to be excluded to an excluding process. Specific procedures for the excluding process are described below.

(16) Step of Inspecting Optical Display Device (S17 in FIG. 1). An inspection device 30 inspects the optical display device W12, which is obtained by bonding the optical members to both sides of the optical display unit. An example of the inspection method is a method of performing imaging and image processing on both sides of the optical display device W12 with reflected light. Another example is a method performed using a polarizing film for inspection placed between a CCD camera and the inspection object. A further example is a method that includes applying light to one side of the optical display device W12 to form a transmitted light image of it and analyzing the image to detect a defect. Known methods may be used for the image processing algorithm. For example, defects may be detected by grayscale determination based on binarization.

(17) Whether the optical display device W12 is non-defective is determined based on the defect information obtained with the inspection device 30. The optical display device W12 determined to be non-defective is fed to the next mounting step. When it is determined to be defective, it is subjected to a reworking process in which a new optical film is bonded and then inspected, and when the product is determined to be non-defective, it is subjected to the mounting step, but when the product is determined to be defective, it is subjected to the reworking process again or discarded.

In the above series of manufacturing steps, the steps of bonding the first optical member F11 and bonding the first optical member F21 may be performed in a continuous manufacturing line, so that the optical display device W12 can be conveniently manufactured. In particular, each of the above steps may be performed in an isolation structure isolated from the factory environment, so that the optical member can be bonded to the optical display unit in an environment with ensured cleanliness, which makes it possible to manufacture the optical display device W12 with high quality.

Another Mode by Skip Cutting Method

Another mode of the first and second cutting steps is described below. This mode is particularly effective, when the first and second inspecting steps are not provided.

Information about defects in each of the first and second sheet materials (such as coordinates of defects, defect type, and defect size) may be attached as coded information (such as QR codes or bar codes) to one transverse end portion of each of the first and second rolls in predetermined pitch unit (for example, 1000 mm). In such a case, the coded information may be read and analyzed at a stage before cutting, and then in each of the first and second cutting steps, the material may be cut into a specific size so that the defects can be separated. The system may be configured so that the defect-containing portion can be remove or bonded to a certain member other than the optical display unit and that the cut piece of the optical member having a specific size and determined to be non-defective can be bonded to the optical display unit. This significantly improves the yield of the optical member.

Embodiment 2

Figure 2:
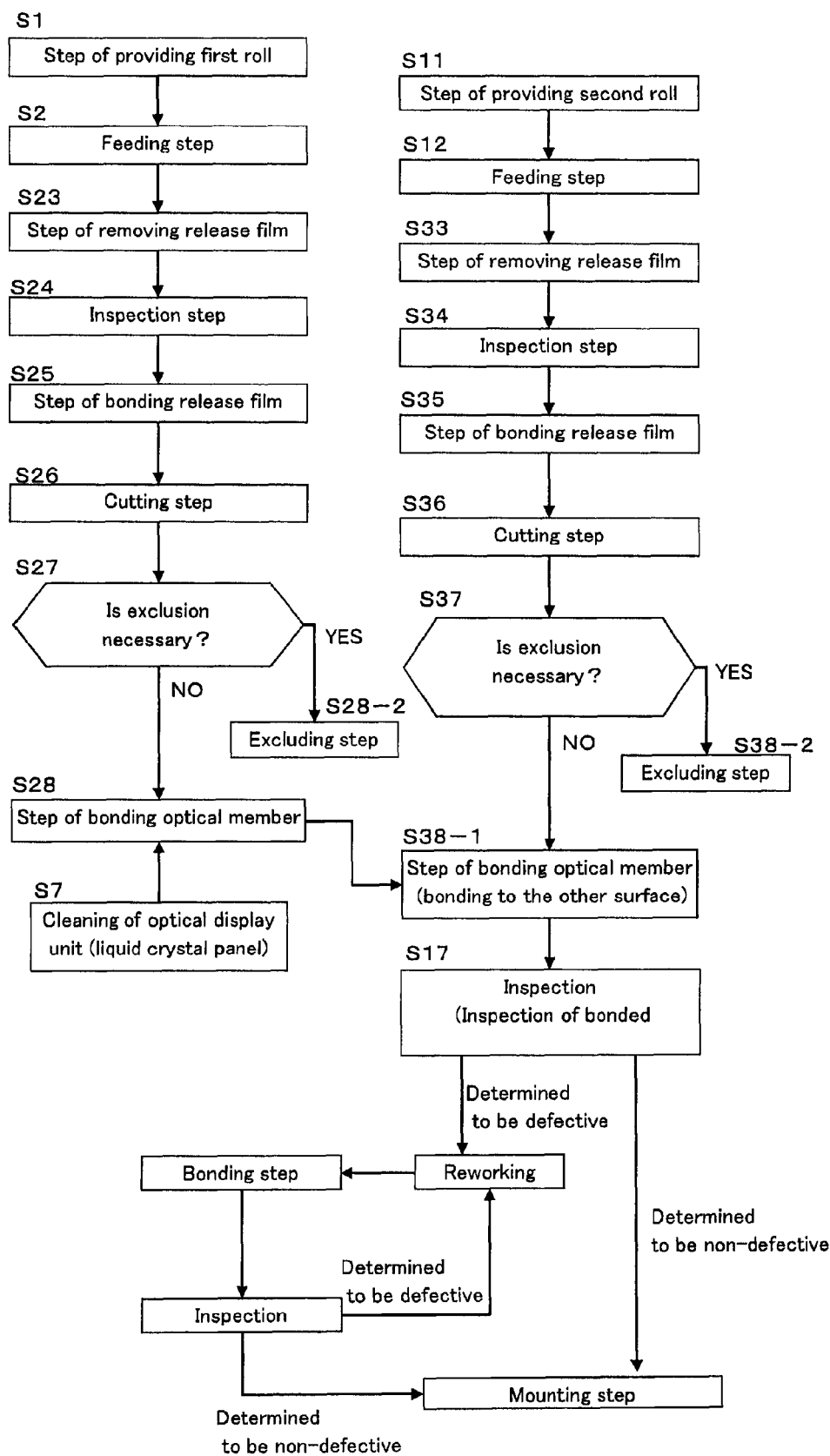
FIG. 2 is a flow chart of an optical display device manufacturing method according to Embodiment 2.
Figure 4:
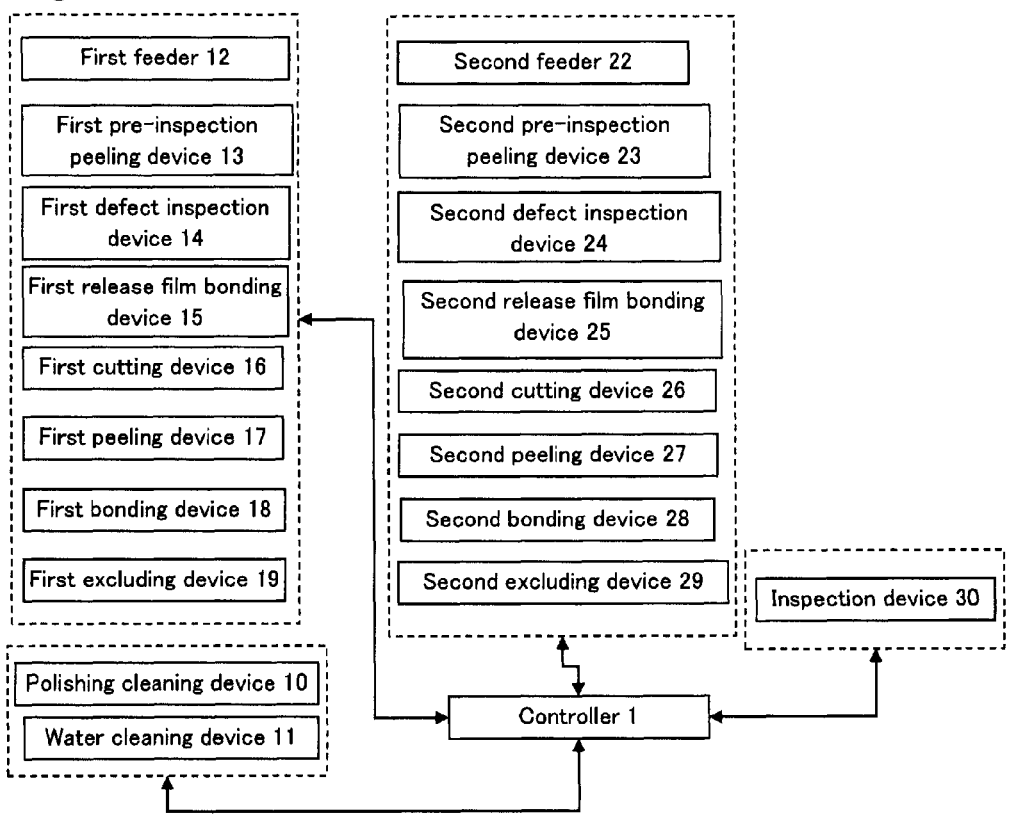
FIG. 4 is a diagram for illustrating a manufacturing system according to Embodiment 2.

Embodiment 2 of the invention is described below. FIG. 2 is a flow chart showing the method of Embodiment 2 for manufacturing an optical display device. FIG. 4 shows the main components of the optical display device manufacturing system in Embodiment 2. The same process as in Embodiment 1 is briefly described below.

(1) Step of Providing First Material Roll (S1 in FIG. 2). A first roll of a first long sheet material (first laminated optical member) F1 is provided. The laminated structure of the first sheet material F1 is the same as in Embodiment 1 shown in FIG. 9.

(2) Feeding Step (S2 in FIG. 2). The first sheet material F1 is fed to the downstream side from the first roll provided and placed.

(3) Step of Removing Release Film (S23 in FIG. 2). A first pre-inspection peeling device 13 peels off the release film F12 from the first sheet material F1 being fed. The peeling mechanism is described in detail below.

(4) First Defect Inspecting Step (S24 in FIG. 2). After the step of removing the release film, a first defect inspection device 14 inspects the surface protecting film-carrying optical member for defects. The defect inspection can be performed on the optical member F11 without the need to take into account the inherent retardation of the release film F12 and defects in the release film F12, such as foreign matter or scratches deposited on or present in the release film F12. The defect inspection method is as described above. If the optical member F11 contains any defect and therefore is to be excluded (corresponding to the second optical member), it is excluded by a first excluding device 19 as described below so as not to be bonded to the optical display unit W.

(5) Step of Bonding Release Film (S25 in FIG. 2). After the first defect inspecting step, a fist release film bonding device 15 bonds a release film H12 to the optical member F11 with the first pressure-sensitive adhesive layer F14 interposed therebetween. In order to maintain the flatness, the bonding step is preferably performed so that bubbles such as air bubbles can be prevented from being trapped. The first release film bonding device 15 is described in detail below.

(6) First Cutting Step (S26 in FIG. 2). The first cutting device 16 cuts each of the surface protecting film F13, the pressure-sensitive adhesive layer F15, the optical member F11, and the first pressure-sensitive adhesive layer F14 into a predetermined size with out cutting the release film H12. For example, the cutting means may be a laser, a cutter, or any other known cutting means.

(7) Determination of Non-Defective Material (S27 in FIG. 2). Whether or not the material is defective is determined as a result of the defective inspection by the first defect inspection device 14. Criteria for determining whether the material is non-defective are preset, for example, depending on the number of defects per predetermined area, the size of defects, and the type of defects. As the accuracy required of display performance increases, the non-defective criteria become stricter.

(8) Step of Bonding First Optical Member (S28-1 in FIG. 2). The optical member F11 determined to be non-defective by the defect inspection (corresponding to the first optical member) is subjected to a bonding step. The surface protecting film-carrying first optical member F11 is bonded to the floor side-surface of the optical display unit, which is horizontally laid.

While the first release film F12 is removed using a first peeling device 17 (peeling step), the first optical member F11, from which the first release film F12 has been removed, is bonded to the optical display unit W with the first pressure-sensitive adhesive layer F14 interposed therebetween using a first bonding device 18. In the bonding step, the first optical member F11 and the optical display unit W are press-bonded as described below between a pair of bonding rollers (a press roller 181 and a guide roller 182).

(9) Step of Excluding Second Optical Member (Object to be excluded) (S28-2 in FIG. 2). The optical member F11 determined to be defective by the defect inspection (corresponding to the second optical member) is sent as an object to be excluded to an excluding process. Specific procedures for the excluding process are described below.

(10) Step of Cleaning Optical Display Unit (S6 in FIG. 2). This step is performed in the same manner as described above.

(11) Step of Providing Second Material Roll (S11 in FIG. 2). A second roll of a second long sheet material (second laminated optical member) F2 is provided. The second sheet material F2 has the laminated structure shown in FIG. 9.

(12) Feeding Step (S12 in FIG. 2). The second sheet material F2 is fed to the downstream side from the second roll provided and placed.

(13) Step of Removing Release Film (S33 in FIG. 2). A second pre-inspection peeling device 23 peels off the release film F22 from the second sheet material F2 being fed. The peeling mechanism is described in detail below.

(14) Second Defect Inspecting Step (S34 in FIG. 2). After the step of removing the release film, a second defect inspection device 24 inspects the surface protecting film-carrying optical member F21 for defects. The defect inspection can be performed on the optical member F21 without the need to take into account the inherent retardation of the release film F22 and defects in the release film F21, such as foreign matter or scratches deposited on or present in the release film F22. The defect inspection method is as described above. If the optical member F21 contains any defect (corresponding to the second optical member), it is excluded by a second excluding device 29 as described below so as not to be bonded to the optical display unit.

(15) Step of Bonding Release Film (S35 in FIG. 2). After the second defect inspecting step, a second release film bonding device 25 bonds a release film H22 to the optical member F21 with the second pressure-sensitive adhesive layer F24 interposed therebetween. In order to maintain the flatness, the bonding step is preferably performed so that bubbles such as air bubbles can be prevented from being trapped. The second release film bonding device 25 is described in detail below.

(16) Second Cutting Step (S36 in FIG. 2). After the step of bonding the release film, a second cutting device 26 cuts each of the surface protecting film F23, the pressure-sensitive adhesive layer F25, the optical member F21, and the second pressure-sensitive adhesive layer F24 into a predetermined size without cutting the second release film H22. For example, the cutting means may be a laser, a cutter, or any other known cutting means.

(17) Determination of Non-Defective Material (S37 in FIG. 2). Whether or not the material is defective is determined as a result of the defective inspection by the second defect inspection device 24. Criteria for determining whether the material is non-defective are preset, for example, depending on the number of defects per predetermined area, the size of defects, and the type of defects. As the accuracy required of display performance increases, the non-defective criteria become stricter.

(18) Step of Bonding First Optical Member (S38-1 in FIG. 2). The optical member F21 determined to be non-defective by the defect inspection (corresponding to the first optical member) is subjected to a bonding step. In this step, the surface protecting film-carrying first optical member F21 is bonded to the ceiling side-surface of the optical display unit, which is horizontally laid.

While the second release film F22 is removed using a second peeling device 27 (peeling step), the first optical member F21 (carrying the surface protecting film), from which the second release film F22 has been removed, is bonded to the optical display unit W1 with the second pressure-sensitive adhesive layer F24 interposed therebetween using a second bonding device 28. Before the first optical member F21 is bonded to the optical display unit W1, the optical display unit W1 may be turned by 90° by the feeding direction-switching mechanism of the feeding mechanism R so that the polarizer of the first optical member F11 and the polarizer of the first optical film F21 can have a crossed Nicols relationship. In the bonding step, the first optical member F21 and the optical display unit W1 are press-bonded as described below between a pair of bonding rollers 281 and 282. As described above, the first optical members F11 and F21 are bonded to one side and the other side of the optical display unit W, respectively, so that an optical display device W12 is manufactured, which has the optical members provided on both sides.

(19) Step of Excluding Second Optical Member (Object to be excluded) (S38-2 in FIG. 2). The optical member F21 determined to be defective by the defect inspection (corresponding to the second optical member) is subjected to an excluding process. Specific procedures for the excluding process are described below.

(20) Step of Inspecting Optical Display Device (S17 in FIG. 2). This step is performed in the same manner as described above.

(21) Whether the optical display device W12 is non-defective is determined based on the defect information obtained with the inspection device 30. The optical display device W12 determined to be non-defective is fed to the next mounting step. When it is determined to be defective, it is subjected to a reworking process in which a new optical member is bonded and then inspected, and when the product is determined to be non-defective, it is subjected to the mounting step, but when the product is determined to be defective, it is subjected to the reworking process again or discarded.

In the above series of manufacturing steps, the steps of bonding the first optical member F11 and bonding the first optical member F21 may be performed in a continuous manufacturing line, so that the optical display device can be conveniently manufactured. In particular, each of the above steps may be performed in an isolation structure isolated from the factory environment, so that the optical member can be bonded to the optical display unit in an environment with ensured cleanliness, which makes it possible to manufacture the optical display device with high quality.

Preferred Manufacturing System for Performing the Manufacturing Method of Embodiment 1 or 2

A description is given below of an example of the preferred manufacturing system for performing the manufacturing method of Embodiment 2.

Figure 5:
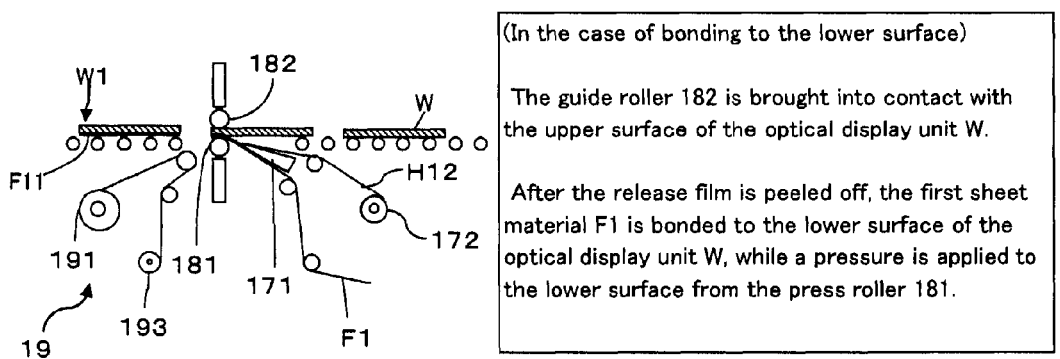
FIG. 5 is a diagram for illustrating the configuration of a manufacturing system.
Figure 6:
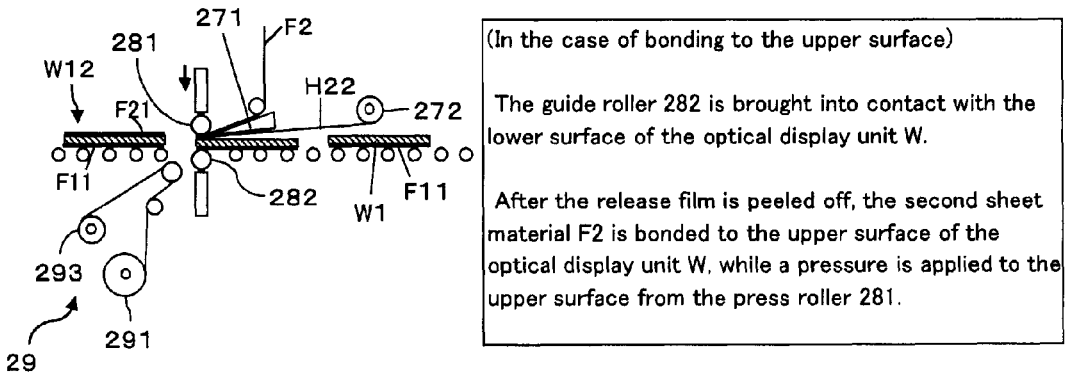
FIG. 6 is a diagram for illustrating the configuration of another manufacturing system.

FIG. 5 is a diagram showing the peeling mechanism 171, the press roller 181 and the first excluding device 19. FIG. 6 is a diagram showing the second peeling device 271, the press roller 281 and the second excluding device 29.

Figure 7:
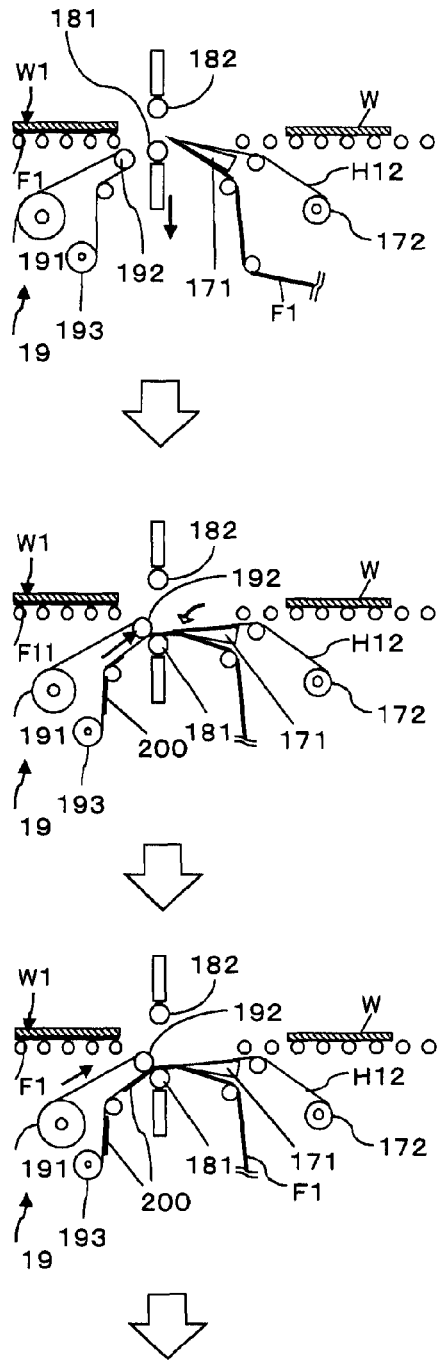
FIG. 7 is a diagram for illustrating the configuration of a further manufacturing system.
Figure 8:
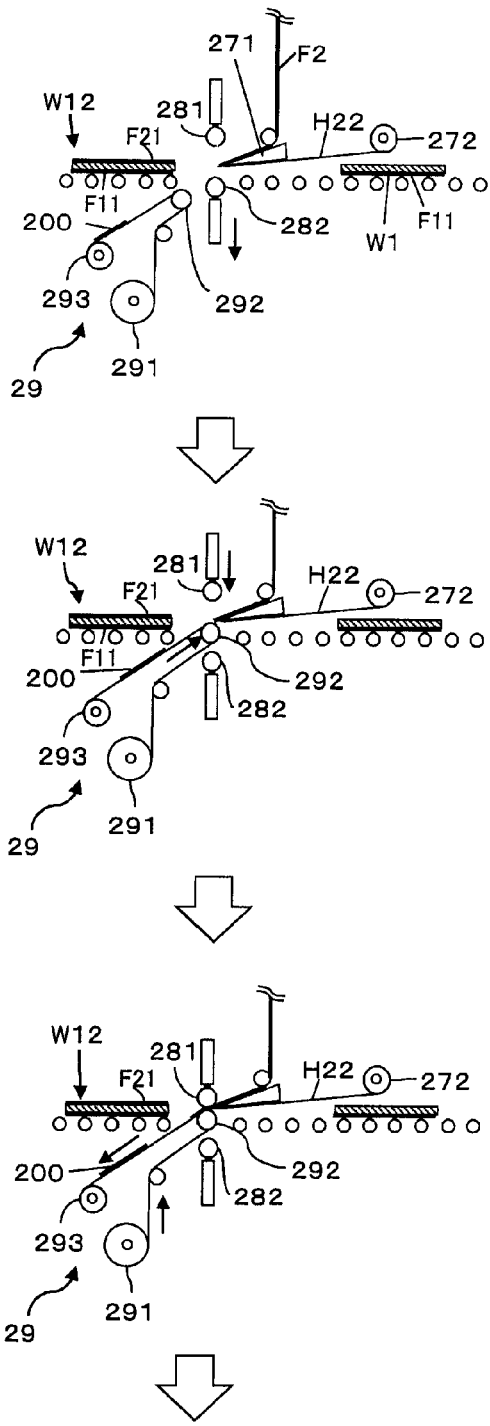
FIG. 8 is a diagram for illustrating the configuration of a further manufacturing system.

FIG. 7 is a diagram for illustrating the mechanism and exclusion operation of the first excluding device 19. The mechanism of the first excluding device 19 is not limited to that illustrated in the drawing and may be modified in various manners within the spirit and scope of the invention. The second excluding device 29 has the same mechanism as the first excluding device 19 but differs in exclusion operation as illustrated in FIG. 8.

The components of the manufacturing system are sequentially described below. The first roll of the first long sheet material (first laminated optical member) F1 is mounted on a roll mount device that is geared to a motor or the like to rotate freely or at a certain speed. A controller 1 is provided to set the rotational speed and to control the drive.

The first feeder 12 is a feeding mechanism to feed the first sheet material F1 to the downstream side. The first feeder 12 is controlled by the controller 1.

The first pre-inspection peeling device 13 is configured to peel off the release film from the first sheet material F1 being fed and to wind the release film onto a take-up device. The speed of winding it onto the take-up device is controlled by the controller 1. The peeling mechanism to peel off the release film has a sharp-ended knife edge and is configured so that the release film can be peeled off by hooking the release film on the knife edge and turning the direction of the feeding and that after the separation of the release film, the first sheet material F1 can be fed in the feeding direction.

The first defect inspection device 14 inspects defects after the peeling of the release film. In the first defect inspection device 14, image data taken by the CCD camera is analyzed so that defects can be detected and that their position coordinates can be calculated. The defect position coordinate data is used in the skip cutting process with the first cutting device 16 as described below.

After the first defect inspection, the first release film bonding device 15 bonds a release film H12 to the first optical member F11 with the first pressure-sensitive adhesive layer F14 interposed therebetween. The release film H12 is unrolled from a roll of the release film H12, and the release film H12 and the optical member F11 are inserted between one or more pairs of rollers so that they are bonded to each other under a certain pressure from the pair of rollers. The rotational speed of the pair of rollers, the pressure, and the feeding are controlled by the controller 1.

After the release film H12 is bonded, the first cutting device 16 cuts each of the optical member F11, the surface protecting film F13, the first pressure-sensitive adhesive layer F14, and the pressure-sensitive adhesive layer F15 into a predetermined size without cutting the release film H12. For example, the first cutting device 16 is a laser. Based on the defect position coordinates detected by the first defect inspection, the first cutting device 16 cuts the material into a predetermined size in such a manner that defective portions can be separated. Therefore, cut pieces having any defective portion are excluded as defective in a later step by the first excluding device 19. Alternatively, the first cutting device 16 may ignore defective portions and continuously cut the material into pieces of a predetermined size. In this case, the bonding process may be designed not to bond, but to remove the defective portion, as described below. In this case, the controller 1 also functions to control the process.

The first cutting device 16 further includes a holding table placed to suck and hold the ceiling side-surface of the first sheet material F1 and a laser placed below the floor side-surface of the first sheet material F1. The laser moves parallel to the width direction of the first sheet material F1 to scan it, so that the first optical member F11, the first pressure-sensitive adhesive layer F14, the surface protecting film F13, and the pressure-sensitive adhesive layer F15 are cut at a predetermined pitch in the feed direction, while the uppermost release film H12 is left uncut (hereinafter this process is referred to as "half cutting" as needed). The feeding mechanism has an accumulating device provided vertically movable upward and downward so that continuous feeding of the first sheet material F1 can be prevented from being stopped on the upstream and downstream sides when the first sheet material F1 is sucked by the holding table. This operation is also controlled by the controller 1.

The first bonding device 18 bonds the optical member F11 (carrying the surface protecting film), from which the release film H12 has been peeled off by the first peeling device 17, to the optical display unit W with the first pressure-sensitive adhesive layer F14 interposed therebetween. Only the optical member F11 determined to be non-defective by the first inspection device 14 (corresponding to the first optical member) is bonded to the optical display unit W. The optical member F11 determined to be non-defective and the optical display unit W are fed to the bonding position in synchronization with each other. As shown in FIG. 5, the optical member F11 and the optical display unit W are fed so that their front end portions can coincide with each other. The controller 1 achieves this by controlling the first feeder 12 (including the accumulating device) and the feeding mechanism so that they can work in synchronization with each other.

In the bonding process as shown in FIG. 5, a press roller 181 and a guide roller 182 are used to press the optical member F11 against the surface of the optical display unit W, while they are bonded together. The pressure and drive movement of the press roller 181 and the guide roller 182 are controlled by the controller 1.

The peeling mechanism 171 of the first peeling device 17 has a sharp-ended knife edge and is configured so that the release film H12 can be peeled off by hooking the release film H12 on the knife edge and turning the direction of the feeding and that after the separation of the release film H12, the optical member F11 (carrying the surface protecting film) can be fed to the surface of the optical display unit W. The peeled release film H12 is wound on a roll 172. The winding on the roll 172 is controlled by the controller 1.

The bonding mechanism includes the press roller 181 and the guide roller 182 opposed thereto. The guide roller 182 includes a rubber roller driven by a motor and is provided with a drive mechanism which allows the roller to move upward and downward. The press roller 181 is placed immediately above the guide roller 182. The press roller 181 includes a metallic roller driven by a motor and is provided with a drive mechanism which allows the roller to move upward and downward. When the optical display unit W is fed to the bonding position, the press roller 181 moves away from the bonding position so that the space between the rollers can be widened. Alternatively, the guide roller 182 and the press roller 181 may each be a rubber roller or a metallic roller. As describe above, the optical display unit W is cleaned by different cleaning devices and fed by the feeding mechanism. The feeding mechanism is also controlled by the controller 1.

Excluding Device Example 1

A description is given of the first excluding device 19 to remove the optical member as an object to be excluded 200 (corresponding to the second optical member). The operation of the first excluding device 19 is described with reference to FIG. 7. The first excluding device 19 is placed on a side closer to the floor than the optical display unit W. In the exclusion operation, the roller for exclusion 192 is shifted to the exclusion position by the drive mechanism (not shown). The drive mechanism to be used to drive the roller for exclusion may be a known drive mechanism. A film for exclusion 191 (corresponding to the tape member) is wound around the roller for exclusion 192. The film for exclusion 191 is unrolled from a rolling means of film for exclusion 191 and taken up on a take-up roller 193 through the roller for exclusion 192. In another mode, a pressure-sensitive adhesive tape may be used in place of the film for exclusion 191.

The release film H12 is peeled off from the second optical member (carrying the surface protecting film) using the knife edge 171 of the first peeling device 17, while the second optical member is fed to a position closer to the floor than the position where the optical display unit W is bonded. The object to be excluded (the surface protecting film-carrying second optical member) 200 is then caught between the press roller 181 and the roller for exclusion 192, so that the object to be excluded 200 is attached to the film for exclusion 191 through the first pressure-sensitive adhesive layer F14. The object to be excluded 200 is excluded by taking up the film for exclusion 191 on the take-up roller 193 (corresponding to the take-up means). The front end of the knife edge 171 is rotated from the bonding position toward the floor side by rotation means, so that the object to be excluded 200 is fed to a position closer to the floor than the position where the optical display unit W is bonded.

(1) For example, when the object to be excluded 200 having any defect and determined to be defective is fed to the bonding position, the feeding of the optical display unit W is stopped (the feeding mechanism has an accumulating mechanism). The press roller 181 is then shifted downward to the position for the exclusion of the object to be excluded 200.

(2) In synchronization with the above operation, the knife edge 171 is rotated so that its front end is turned from an obliquely upward direction to the floor side. The rotation angle is determined depending on the specifications of the first sheet material F1, the feed speed and so on.

(3) In synchronization with the operations (1) and (2), the roller for exclusion 192 around which the film for exclusion 191 is wound is shifted to the position of the press roller 181.

(4) The release film H12 is peeled off with the knife edge 171, and at the same time, the object to be excluded 200 is fed and caught between the press roller 181 and the roller for exclusion 192 so that it can be attached to the film for exclusion 191 through the first pressure-sensitive adhesive layer F14.

(5) The object to be excluded 200 is pressed against the roller for exclusion 192 by the press roller 181, so that the object to be excluded 200 is attached to the film for exclusion 191 through the first pressure-sensitive adhesive layer F14. The object to be excluded 200 and the film for exclusion 191 are then taken up together on the take-up roller 193. In this process, the speed of the film for exclusion 191 being moved by the take-up roller 193 is synchronized with the speed of the object to be excluded 200 being fed. For example, servomotors may be used to drive and rotate the take-up roller 193 and the object to be excluded 200 feed roller (not shown), and the servomotors may be synchronously controlled by the controller 1 so that they can simultaneously rotate at the same speed.

(6) After the object to be excluded 200 is excluded, the press roller 181, the roller for exclusion 192 and the knife edge 171 are each returned to the original position. The operations described above are controlled by the controller 1.

Next, the operation of the second excluding device 29 is described with reference to FIG. 8.

(1) For example, when the optical member F21 (corresponding to the second optical member) of the object to be excluded 200 having any defect and determined to be defective is fed to the bonding position, the feeding of the optical display unit W1 is stopped, and the feeding of the long release film F23 is also temporarily stopped in such a state that a front portion of the second optical member F21 is fed from the peeling device 271 (it should be noted that the feeding mechanism has an accumulating mechanism). The guide roller 282 is then vertically shifted downward.

(2) The roller for exclusion 292 around which the film for exclusion 292 is wound is then shifted by the drive mechanism to the bonding position, which is the regular position of the guide roller 282 (the shifting process).

(3) The press roller 281 is vertically shifted downward.

(4) The object to be excluded 200 is pressed against the roller for exclusion 292 by the press roller 281, so that a front portion of the object to be excluded 200 is attached to the non-adhesive surface of the film for exclusion 292 through the second pressure-sensitive adhesive layer F24 (the attaching process). The feeding of the long release film F22 is then started again, and the take-up on the take-up roller 293 is started, so that the object to be excluded 200 and the film for exclusion 292 are taken up together on the take-up roller 293 (the taking up process). In this process, the speed of the film for exclusion 292 being moved by the take-up roller 293 is synchronized with the speed of the object to be excluded 200 being fed. For example, servomotors may be used to drive and rotate the take-up roller 293 and the object to be excluded 200 feed roller (not shown), and the servomotors may be synchronously controlled by the controller 1 so that they can simultaneously rotate at the same speed. In this process, the film for exclusion 292 to which the second optical member F21 is attached is taken up to such a position that the second optical member does not overlap with the whole of the next second optical member, and then the take-up is stopped.

(5) After the exclusion, the press roller 281 is elevated, and the roller for exclusion 292 and the guide roller 282 are each returned to the original position. The operations described above are controlled by the controller 1.

The optical display unit W1 to which the first optical member F11 has been bonded is transported to the downstream side, and the optical member F21 of the second sheet material (second laminated optical member) F2 is bonded thereto. Hereinafter, the same or similar components will be described only briefly.

When the polarizer of the optical member F21 is bonded in 90° relation (crossed Nicols relation) with the polarizer of the optical member F11, the optical display unit W1 is turned by 90° by the feed direction-switching mechanism of the feeding mechanism, and then the optical member F21 is bonded thereto. The method described below for bonding the optical member F21 includes performing each step, while keeping the second sheet material F2 turned upside down (with the release film facing upward), and bonding the optical member F21 to the lower side of the optical display unit W1.

The second roll of the second long sheet material F2 is mounted on a roll mount device that is geared to a motor or the like to rotate freely or at a certain speed. The controller 1 determines the rotational speed and controls the drive.

The second feeder 22 is a feeding mechanism to feed the second sheet material F2 to the downstream side. The second feeder 22 is controlled by the controller 1.

The second pre-inspection peeling device 23 is configured to peel off the release film from the second sheet material F2 being fed and to wind the release film onto a take-up device. The speed of winding it onto the take-up device is controlled by the controller 1. The peeling mechanism has a sharp-ended knife edge and is configured so that the release film can be peeled off by hooking the release film on the knife edge and turning the direction of the feeding and that after the separation of the release film, the second sheet material F2 can be fed in the feeding direction.

The second defect inspection device 24 inspects defects after the release film is peeled off. In the second defect inspection device 24, image data taken by the CCD camera is analyzed so that defects can be detected and that their position coordinates can be calculated. The defect position coordinate data is used in the skip cutting process with the second cutting device 26 as described below.

After the second defect inspection, the second release film bonding device 25 bonds a release film H22 to the optical member F21 with the second pressure-sensitive adhesive layer F24 interposed therebetween. The release film H22 is unrolled from a roll of the release film H22, and the release film H22 and the optical member F21 are inserted between one or more pairs of rollers so that they are bonded to each other under a certain pressure from the pair of rollers. The rotational speed of the pair of rollers, the pressure, and the feeding are controlled by the controller 1.

After the release film H22 is bonded, the second cutting device 26 cuts each of the optical member F21, the surface protecting film F23, the second pressure-sensitive adhesive layer F24, and the pressure-sensitive adhesive layer F25 into a predetermined size, while leaving the release film H22 uncut (without cutting the release film H22). For example, the second cutting device 26 is a laser. Based on the defect position coordinates detected by the second defect inspection, the second cutting device 26 cuts the material into a predetermined size in such a manner that defective portions can be separated. Thus, cut pieces having any defective portion are excluded as defective in a later step by the second excluding device 29. Alternatively, the second cutting device 26 may ignore defective portions and continuously cut the material into pieces of a predetermined size. In this case, the bonding process may be designed not to bond, but to remove the defective portion, as described below. In this case, the controller 1 also functions to control the process.

The second cutting device 26 further includes a holding table placed to suck and hold the floor side-surface of the second sheet material F2 and a laser placed above the ceiling side-surface of the second sheet material F2. The laser moves parallel to the width direction of the second sheet material F2 to scan it, so that the optical member F21, the second pressure-sensitive adhesive layer F24, the surface protecting film F23, and the pressure-sensitive adhesive layer F25 are cut at a predetermined pitch in the feed direction, while the lowermost release film H22 is left uncut. The feeding mechanism has an accumulating device provided vertically movable upward and downward so that continuous feeding of the second sheet material F2 can be prevented from being stopped on the upstream and downstream sides when the second sheet material F2 is sucked by the holding table. This operation is also controlled by the controller 1.

The second bonding device 28 bonds the optical member F21 (carrying the surface protecting film), from which the release film H22 has been peeled off by the second peeling device 27, to the optical display unit W1 with the second pressure-sensitive adhesive layer F24 interposed therebetween. In the bonding process as shown in FIG. 6, a press roller 281 and a guide roller 282 are used to press the optical member F21 against the surface of the optical display unit W1, while they are bonded together. The pressure and drive movement of the press roller 281 and the guide roller 282 are controlled by the controller 1. Only the optical member F21 determined to be non-defective by the second inspection device 24 (corresponding to the first optical member) is bonded to the optical display unit W1. The optical member F21 determined to be non-defective and the optical display unit W1 are fed to the bonding position in synchronization with each other. As shown in FIG. 6, the optical member F21 and the optical display unit W1 are fed so that their front end portions can coincide with each other. The controller 1 achieves this by controlling the second feeder 22 (including the accumulating device) and the feeding mechanism so that they can work in synchronization with each other.

The peeling mechanism 271 of the second peeling device 27 has a sharp-ended knife edge and is configured so that the release film H22 can be peeled off by hooking the release film H22 on the knife edge and turning the direction of the feeding and that after the separation of the release film H22, the first optical member F21 can be fed to the surface of the optical display unit W1. The peeled release film H22 is wound on a roll 272. The winding on the roll 272 is controlled by the controller 1.

The bonding mechanism includes the press roller 281 and the guide roller 282 opposed thereto. The guide roller 282 includes a rubber roller driven by a motor and is provided movable upward and downward. Immediately above the guide roller 282, the press roller 281 including a metallic roller driven by a motor is provided movable upward and downward. When the optical display unit W1 is fed to the bonding position, the press roller 281 is shifted to a lower position so that the space between the rollers is widened. Alternatively, the guide roller 282 and the press roller 281 may each be a rubber roller or a metallic roller.

The optical display device W12 obtained by bonding the optical members F11 and F21 to the optical display unit W is transported to an inspection device 30. The inspection device 30 inspects both sides of the optical display device W12 transported thereto.

The light source of the inspection device 30 vertically illuminates the lower surface of the optical display device W12, and the transmitted light is captured as image data by the CCD camera of the inspection device 30. The light source may also illuminate the surface of the optical display device W12 at a predetermined angle, and the reflected light may be captured as image data by the CCD camera. The image data is subjected to image analysis to determine whether the product is defective.

For example, the timing of the operation of each device is calculated by a detection method using sensors placed at specific locations or by a method of detecting the rotating part of the feeder or the feeding mechanism with a rotary encoder or the like. The controller 1 may be implemented in cooperation with software programs and hardware resources such as CPU and memories. In this case, program software, procedures, various settings, and so on have been previously stored in memories. Private circuits, firmware, or the like may also be used for the implementation. The controller 1 collectively controls the individual devices. However, this is non-limiting, and alternatively, a control unit may be provided per each device, and the system may be configured so that each control unit may control the operation of each device according to the command from the controller 1.

The manufacturing system described above is configured so that the optical member F11 (carrying the surface protecting film) is bonded to the lower surface of the optical display unit W, while the optical member F21 (carrying the surface protecting film) is bonded to the upper surface of the optical display unit W1. The first and second excluding devices 19 and 29 are placed below the route through which the optical display units W and W1 are transported. This allows easy recovery of the object to be excluded. Specifically, if the excluding device is placed above the ceiling side-surface of the optical display unit, the excluded member cannot easily be recovered, and some foreign matter intruding during the recovery may undesirably drop onto the optical display unit.

Other Embodiments of the Manufacturing System

In the manufacturing system described above, the optical display unit is horizontally laid, and the optical member is first bonded to its floor side-surface. However, this manufacturing system is non-limiting, and alternatively, the optical member may be first bonded to the ceiling side-surface of the optical display unit.

Examples of polarizers used to form the optical members and examples of films used on one or both sides of the polarizer generally include the materials described below, although some of them have been described above.

Polarizer

The processes of dyeing, crosslinking and stretching a polyvinyl alcohol film are not necessarily independently performed and may be performed at the same time or in any order. The polyvinyl alcohol film may be subjected to a swelling process before use. The process may generally include the steps of immersing the polyvinyl alcohol film in a solution containing iodine or a dichroic dye so that the film is dyed with the iodine or the dichroic dye being adsorbed thereto, then washing the film, uniaxially stretching the film to 3 to 7 times in a solution containing boric acid, borax or the like, and then drying the film. It is particularly preferred that the step of stretching the film in a solution containing iodine or a dichroic dye should be followed by the steps of further stretching the film in a solution containing boric acid, borax or the like (two-stage stretching) and then drying the film, so that the iodine can be highly oriented to provide good polarizing properties.

As a non-limiting example, the polarizer and a polarizer-protecting transparent film serving as a protective layer may be bonded to each other with a bonding adhesive such as a bonding adhesive including a vinyl alcohol polymer or a bonding adhesive including a vinyl alcohol polymer and a water-soluble crosslinking agent therefor such as boric acid, borax, glutaraldehyde, melamine, or oxalic acid. The bonding adhesive layer may be formed by applying and drying an aqueous solution layer.

In the process of preparing the aqueous solution, if necessary, any other additive or a catalyst such as an acid may also be added.

Polarizer Protecting Layer (Polarizer Protecting Film)

Any appropriate transparent film may be used as the polarizer protecting film to be placed one or both sides of the polarizer. For example, thermoplastic reins with a high level of transparency, mechanical strength, thermal stability, water-blocking performance, isotropy, or the like may be used. Examples of such thermoplastic resins include cellulose resins such as triacetylcellulose, polyester resins, polyethersulfone resins, polysulfone resins, polycarbonate resins, polyamide resins, polyimide resins, polyolefin resins, (meth) acrylic resins, cyclic polyolefin resins (norbornene resins), polyarylate resins, polystyrene resins, polyvinyl alcohol resins, and any blend thereof. While a transparent protective film may be bonded to one side of the polarizer with an adhesive layer, a thermosetting resin or an ultraviolet-curable resin such as a (meth)acrylic, urethane, acrylic urethane, epoxy, or silicone resin may be used to form a transparent protective film on the other side of the polarizer. The transparent protective film may contain any one or more appropriate additives. Examples of such an additive include an ultraviolet absorbing agent, an antioxidant, a lubricant, a plasticizer, a release agent, an anti-discoloration agent, a flame retardant, a nucleating agent, an antistatic agent, a pigment, and a colorant.

The transparent protective film may be subjected to a surface modification treatment for improving the tackiness to the polarizer, before it is coated with an adhesive. Examples of such a treatment include a corona treatment, a plasma treatment, a flame treatment, an ozone treatment, a primer treatment, a glow treatment, a saponification treatment, and a coupling agent treatment. If necessary, an antistatic layer may also be formed.

For practical use, the optical member according to the invention may typically be an optical film having a multilayered structure in which various optical layers are laminated. Examples of such optical layers include, but are not limited to, layers formed by performing a hard coating treatment, an antireflection treatment, or a surface treatment for anti-sticking, diffusion or antiglare purpose on the transparent protective film surface to which no polarizer will be bonded (the surface on which the adhesive coating layer is not provided), and oriented liquid crystal layers for viewing angle compensation or other purposes. An optical film(s) for use in forming a liquid crystal display or the like, such as a reflector, a transflector, or a retardation plate (including a wavelength plate (λ plate) such as a half or quarter wavelength plate) may also be used in the form of a layer or a laminate of two or more layers.

Retardation Plate

An example of the optical film to be placed on the polarizer includes a retardation plate. Examples of the retardation plate include birefringent films produced by uniaxially or biaxially stretching polymer materials, oriented liquid crystal polymer films, and oriented liquid crystal polymer layers supported on films. The stretching process may be typically performed by roll stretching, long-gap stretching, tenter stretching, or tubular stretching. Uniaxial stretching is generally performed to a stretch ratio of about 1.1 to about 3. The thickness of the retardation plate is generally, but not limited to, from 10 to 200 µm, preferably from 20 to 100 µm.

Examples of the polymer materials include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyvinyl alcohol, polyamide, polyimide, polyolefin, polyvinyl chloride, cellulose polymers, and various types of binary or ternary copolymers thereof, graft copolymers thereof, and any blend thereof. Any of these polymer materials may be formed into an oriented product (a stretched film) by stretching or the like.

The retardation plate may have any appropriate retardation depending on the intended use such as compensation for coloration, viewing angle, or the like associated with the birefringence of various wave plates or liquid crystal layers. Two or more types of retardation plates may also be laminated to provide controlled optical properties such as controlled retardation.

Pressure-Sensitive Adhesive

In an embodiment of the invention, the polarizing plate or the optical member is provided with an adhesive layer for bonding it to another component such as a liquid crystal cell. The adhesive layer may be formed of any appropriate adhesive such as an acrylic adhesive according to conventional techniques. The adhesive layer preferably has low moisture absorption coefficient and high heat resistance, in order to prevent moisture absorption-induced foaming or peeling, to prevent optical property degradation due to a thermal expansion difference or the like, to prevent warping of a liquid crystal cell, and to form an image display with high quality and high durability. The adhesive layer may also contain fine particles so as to have light diffusing properties. The adhesive layer may be provided as needed on a necessary surface. Concerning a polarizing plate comprising a polarizer and a polarizer protecting film layer, for example, an adhesive layer may be provided as needed on one or both sides of the polarizer protecting layer.

Release Film

The surface of the pressure-sensitive adhesive layer to be exposed is temporarily covered with a release film (also called separator) for anti-fouling or the like until use. This can prevent contact with the adhesive layer during usual handling. A conventional appropriate separator may be used, such as an appropriate thin leave including a plastic film, a rubber sheet, a paper sheet, a cloth, a nonwoven fabric, a net, a foam sheet, a metal leaf, or a laminate thereof, which is optionally coated with any appropriate release agent such as a silicone, long-chain alkyl or fluoride release agent, or molybdenum sulfide.

Surface Protecting Film

A surface protecting film may be provided on the opposite side of the optical member from the side where the separator is provided. The main purpose thereof is anti-scratch, anti-fouling, or the like. Examples of the surface protecting film include an appropriate thin leave such as a plastic film, a rubber sheet, a paper sheet, a cloth, a nonwoven fabric, a net, a foam sheet, a metal leaf, or a laminate thereof, which is optionally coated with any appropriate release agent such as a silicone, long-chain alkyl or fluoride release agent, or molybdenum sulfide.

Liquid Crystal Display Device

The optical member of the invention is preferably used to form any of various devices such as liquid crystal displays. Liquid crystal displays may be formed according to conventional techniques. Specifically, a liquid crystal display may be typically formed by assembling a liquid crystal cell and optical films, and optional components such as a lighting system and by incorporating a driving circuit according to conventional techniques, except that the optical film is used according to the invention. Any type of liquid crystal cell such as TN type, STN type or n type may be used.

The invention claimed is:

1. A method for manufacturing an optical display device, comprising the steps of:
   bonding a first optical member to an optical display unit,
   excluding a second optical member as an object to be excluded from a long release film that carries the first and second optical members,
   peeling off the long release film from the second optical member by winding the long release film on a peeling device; wherein the second optical member is placed on the long release film with a pressure-sensitive adhesive layer interposed therebetween, and
   the excluding step including:
   a process of shifting a roller for exclusion around which a tape member having a non-adhesive surface unrolled from a tape member rolling means is wound;
   a process of attaching the second optical member that the release film is peeled off by winding the long release film on the peeling device to the non-adhesive surface of the tape member through the pressure-sensitive adhesive layer;
   a process of taking up the second optical member-carrying tape member by a take-up means, and
   wherein the bonding step further comprises a process of peeling off the long release film from the first optical member by winding the long release film on the peeling device.

2. The method according to claim 1, further comprising, before the excluding step, the step of cutting a long optical member in a long laminated optical member including at least the long release film and the long optical member placed thereon, while leaving the long release film uncut, wherein
   the first and second optical members are obtained by cutting the long optical member without cutting the long release film in the cutting step.

3. The method according to claim 1, wherein in the shifting process, the roller for exclusion is shifted to such a position that a front portion of the second optical member fed from the peeling device is attached to the tape member on the take-up means side and a rear portion of the second optical member is attached to the tape member on the tape member rolling means side.

4. The method according to claim 1, wherein the speed of taking up the tape member in the taking-up process is synchronized with the speed of feeding the second optical member from the peeling device in the peeling process.

5. The method according to claim 1, wherein the step of excluding the second optical member from the long release film comprises:
   temporarily stopping the feeding of the long release film, when at least the front portion of the second optical member is fed from the peeling device in the peeling process;
   attaching at least the front portion of the second optical member to the tape member, while the take-up of the tape member is stopped in the taking-up process; and
   starting the feeding of the long release film at the same time as starting the take-up of the tape member in the taking-up process.

6. The method according to claim 1, wherein in the process of taking up the tape member to which the nth piece (wherein n is a natural number) of the second optical member is attached, the take-up is stopped, after the tape member is taken up to such a position that the nth piece of the second optical member and the (n+1)th piece of the second optical member do not overlap, at least partially.

7. The method according to claim 1, wherein in the attaching process, the second optical member is attached to the tape member at a position above the optical display unit.

8. The method according to claim 1, wherein in the attaching process, the second optical member is attached to the tape member at a position below the optical display unit.

9. The method according to claim 1, wherein
   in the bonding step, the optical display unit and the first optical member are caught between a pair of bonding rollers so that the first optical member is bonded to the optical display unit, and
   in the attaching process, the second optical member is caught between one of the bonding rollers and the roller for exclusion so that the second optical member is attached to the tape member.

10. A method for excluding an object to be excluded placed on a long release film and having a pressure-sensitive adhesive layer, comprising:
    a process of shifting a roller for exclusion around which a tape member having a non-adhesive surface unrolled from tape member rolling means is wound;
    a process of attaching the object to be excluded that the release film is peeled off by winding the long release film on a peeling device to the non-adhesive surface of the tape member through the pressure-sensitive adhesive layer; and
    a process of taking up the tape member attached the object to be excluded by take-up means, and
    wherein the attaching step further comprises a process of peeling off the long release film from a first optical member by winding the long release film on the peeling device.

11. The method according to claim 10, wherein in the shifting process, the roller for exclusion is shifted to such a position that a front portion of the object to be excluded is attached to the tape member on the take-up means side and a rear portion of the object to be excluded is attached to the tape member on the tape member rolling means side.

12. The method according to claim 10, wherein in the process of taking up the tape member to which the nth piece (wherein n is a natural number) of the object to be excluded is attached, the take-up is stopped, after the tape member is taken up to such a position that the nth piece of the object to be excluded and the (n+1)th piece of the object to be excluded do not overlap, at least partially.

13. The method according to claim 10, wherein the object to be excluded is an optical member obtained by cutting a long optical member in a long laminated optical member comprising at least a long release film and the long optical member placed thereon without cutting the long release film.

* * * * *